US011409185B2

(12) United States Patent
Kuse et al.

(10) Patent No.: US 11,409,185 B2
(45) Date of Patent: Aug. 9, 2022

(54) COMPACT MICRORESONATOR FREQUENCY COMB

(71) Applicant: IMRA America, Inc., Ann Arbor, MI (US)

(72) Inventors: Naoya Kuse, Longmont, CO (US); Martin E. Fermann, Dexter, MI (US); Tomohiro Tetsumoto, Longmont, CO (US); Antoine Jean Gilbert Rolland, Longmont, CO (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 17/225,012

(22) Filed: Apr. 7, 2021

(65) Prior Publication Data

US 2021/0294180 A1    Sep. 23, 2021

Related U.S. Application Data

(63) Continuation of application No. PCT/US2019/044992, filed on Aug. 2, 2019.
(Continued)

(51) Int. Cl.
*G02F 1/35* (2006.01)
*G01S 7/481* (2006.01)
*G04F 5/14* (2006.01)

(52) U.S. Cl.
CPC ............ *G02F 1/353* (2013.01); *G01S 7/4814* (2013.01); *G04F 5/14* (2013.01); *G02F 2203/17* (2013.01); *G02F 2203/56* (2013.01)

(58) Field of Classification Search
CPC ...................................................... G02F 1/353
(Continued)

(56) References Cited

U.S. PATENT DOCUMENTS 7,982,944 B2   7/2011   Kippenberg et al.
8,111,722 B1   2/2012   Maleki et al.
(Continued)

FOREIGN PATENT DOCUMENTS

EP   1411387 A1   4/2004
EP   3385784 A1   10/2018
(Continued)

OTHER PUBLICATIONS

T.C. Briles et al., "Kerr-microresonator solitons for accurate carrier-envelope-frequency stabilization," arXiv:1711.06251 (2017).
(Continued)

*Primary Examiner* — Joseph Chang
(74) *Attorney, Agent, or Firm* — Knobbe, Martens, Olson & Bear, LLP

(57) ABSTRACT

Systems and methods for precision control of microresonator (MR) based frequency combs can implement optimized MR actuators or MR modulators to control long-term locking of carrier envelope offset frequency, repetition rate, or resonance offset frequency of the MR. MR modulators can also be used for amplitude noise control. MR parameters can be locked to external reference frequencies such as a continuous wave laser or a microwave reference. MR parameters can be selected to reduce cross talk between the MR parameters, facilitating long-term locking. The MR can be locked to an external two wavelength delayed self-heterodyne interferometer for low noise microwave generation. An MR-based frequency comb can be tuned by a substantial fraction or more of the free spectral range (FSR) via a feedback control system. Scanning MR frequency combs can be applied to dead-zone free spectroscopy, multi-wavelength LIDAR, high precision optical clocks, or low phase noise microwave sources.

8 Claims, 23 Drawing Sheets

Related U.S. Application Data

(60) Provisional application No. 62/824,040, filed on Mar. 26, 2019, provisional application No. 62/769,700, filed on Nov. 20, 2018, provisional application No. 62/744,862, filed on Oct. 12, 2018.

(58) Field of Classification Search
USPC .......................................................... 331/94.1
See application file for complete search history.

(56) References Cited

U.S. PATENT DOCUMENTS

| | | | |
|---|---|---|---|
| 9,348,194 | B2 | 5/2016 | Herr et al. |
| 2004/0264977 | A1 | 12/2004 | Yap et al. |
| 2009/0087186 | A1 | 4/2009 | Holman et al. |
| 2015/0185141 | A1* | 7/2015 | Fermann ............... H01S 3/0092 356/451 |
| 2018/0048113 | A1 | 2/2018 | Fermann et al. |
| 2018/0048116 | A1 | 2/2018 | Adachi et al. |
| 2018/0180655 | A1 | 6/2018 | Kuse et al. |
| 2019/0235445 | A1 | 8/2019 | Han et al. |

FOREIGN PATENT DOCUMENTS

| | | |
|---|---|---|
| JP | 2009-025245 | 2/2009 |
| JP | 2009-516227 | 4/2009 |
| JP | 2014-523002 | 9/2014 |
| JP | 2015-005601 | 1/2015 |
| JP | 2015-225328 | 12/2015 |
| WO | WO 2007/057713 A2 | 5/2007 |
| WO | WO 2013/003859 A2 | 1/2013 |
| WO | WO 2016/164263 A1 | 10/2016 |
| WO | WO 2018/001442 A1 | 1/2018 |
| WO | WO 2018/044500 A1 | 3/2018 |
| WO | WO 2020/076402 A1 | 4/2020 |

OTHER PUBLICATIONS

T.C. Briles et al., "Interlocking Kerr-microresonator frequency combs for microwave to optical synthesis," Opt. Lett. 43, 2933-2936 (2018).
R. Boudot et al., "High-precision temperature stabilization for sapphire resonators in microwave oscillators," Rev. Sci. Instr. vol. 76, p. 095110, doi.org/10.1063/1.2039387 (2005).
N. Kuse et al., "Continuous scanning of a dissipative Kerr-microresonator soliton comb by Pound-Drever-Hall locking," CLEO 2019, SF2I.5.pdf (2019).
Y. Li et al., "Low-noise millimeter-wave synthesis from a dual-wavelength fiber Brillouin cavity," Op. Lett. vol. 44, pp. 359-363, doi.org/10.1364/OL.44.000359 (2019).
W. Qiu et al., "Stimulated Brillouin scattering in nanoscale silicon step-index waveguides: a general framework of selection rules and calculating SBS gain," Optics Express 21, 31402-419 (2013).
S. Zhang et al., "Terahertz wave generation using a soliton microcomb," Opt. Expr., vol. 27, p. 35257-35266, doi.org/10.1364/OE.27.035257 (2019).
D.C. Cole et al., "Direct generation of solitons with a reversed soliton step in a microresonator pumped by a phase-modulated laser," CLEO OSA Technical Digest, paper SW3A.6, https://doi.org/10.1364/CLEO_SI.2018.SW3A.6 (2018).
T.E. Drake et al., "Thermal decoherence and laser cooling of Kerr microresonator solitons," arXiv:1903.00431v1 (2019).
T. M. Fortier et al., "Generation of ultrastable microwaves via optical frequency division," Nature Photonics, vol. 5, pp. 425-429 (2011).
H. Guo et al., "Universal dynamics and deterministic switching of dissipative Kerr solitons in optical microresonators," Nature Physics, vol. 13, pp. 94-102, https://doi.org/10.1038/nphys3893 (2017).
International Search Report and Written Opinion dated Nov. 28, 2019 for Int'l Appl. No. PCT/US2019/044992.
N. Kuse et al., "Control of Kerr-microresonator optical frequency comb by a dual-parallel Mach-Zehnder interferometer," Op. Expr., vol. 27, pp. 3873-3883 (2019).
C. T. Phare et al., "Graphene electro-optic modulator with 30 GHz bandwidth," Nature Photonics, vol. 9, pp. 511-514 (2015).
A. Rolland et al., "Non-linear optoelectronic phase-locked loop for stabilization of opto-millimeter waves: towards a narrow linewidth tunable THz source," Opt. Expr., vol. 19, pp. 17944 (2011).
N. Satyan et al., "Precise control of broadband frequency chirps using optoelectronic feedback", Opt. Expr., 17, 15991 (2009).
B. Stern et al., "Battery-operated integrated frequency comb generation," Nature, vol. 562, p. 401 (2018).
J. R. Stone et al., "Thermal and Nonlinear Dissipative-Soliton Dynamics in Kerr-Microresonator Frequency Combs," Phys. Rev. Lett., vol. 121, pp. 063902 (2018).
C. Wang et al., "An on-chip fully electronic molecular clock based on sub-terahertz rotational spectroscopy," Nature Electronics, vol. 1, pp. 421-427, https://doi.org/10.1038/s41928-018-0102-4 (2018).
J. Wu et al., "Harnessing optical micro-combs for microwave photonics," arXiv.org, doi: 10.1109/JSTQE.2018.2805814 (2017).
M. Yu et al., "Gas-phase microresonator-based comb spectroscopy without an external pump laser," arXiv:1806.01348v1 (2018).
T. Zhang et al., "Nonlinear error correction for FMCW LADAR by the amplitude modulation method," Opt. Expr., vol. 26, pp. 11510 (2018).

* cited by examiner

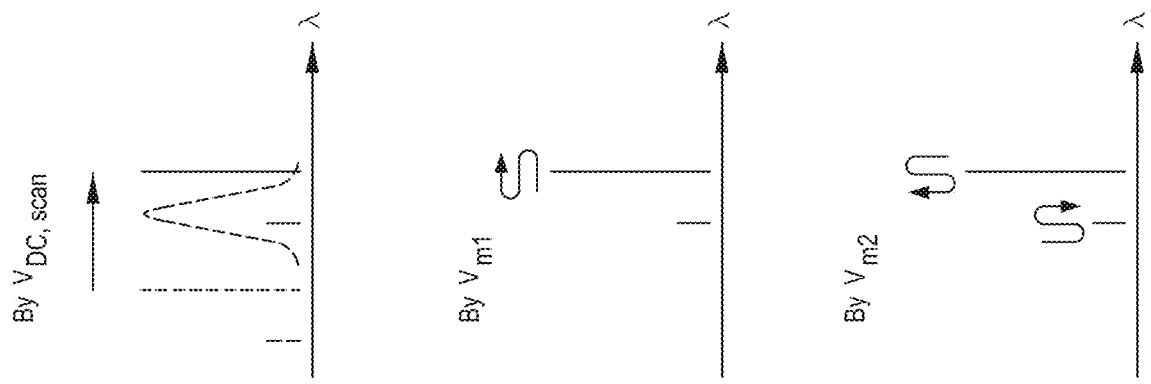
FIG. 1B
FIG. 1C
FIG. 1D
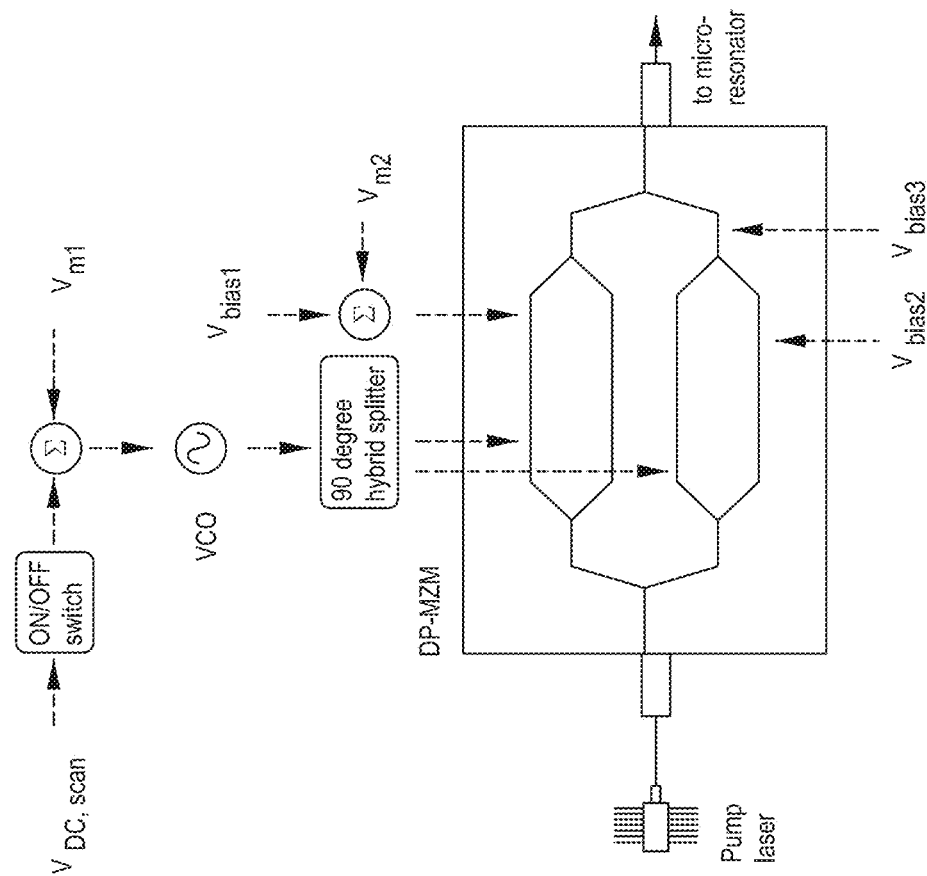
FIG. 1A

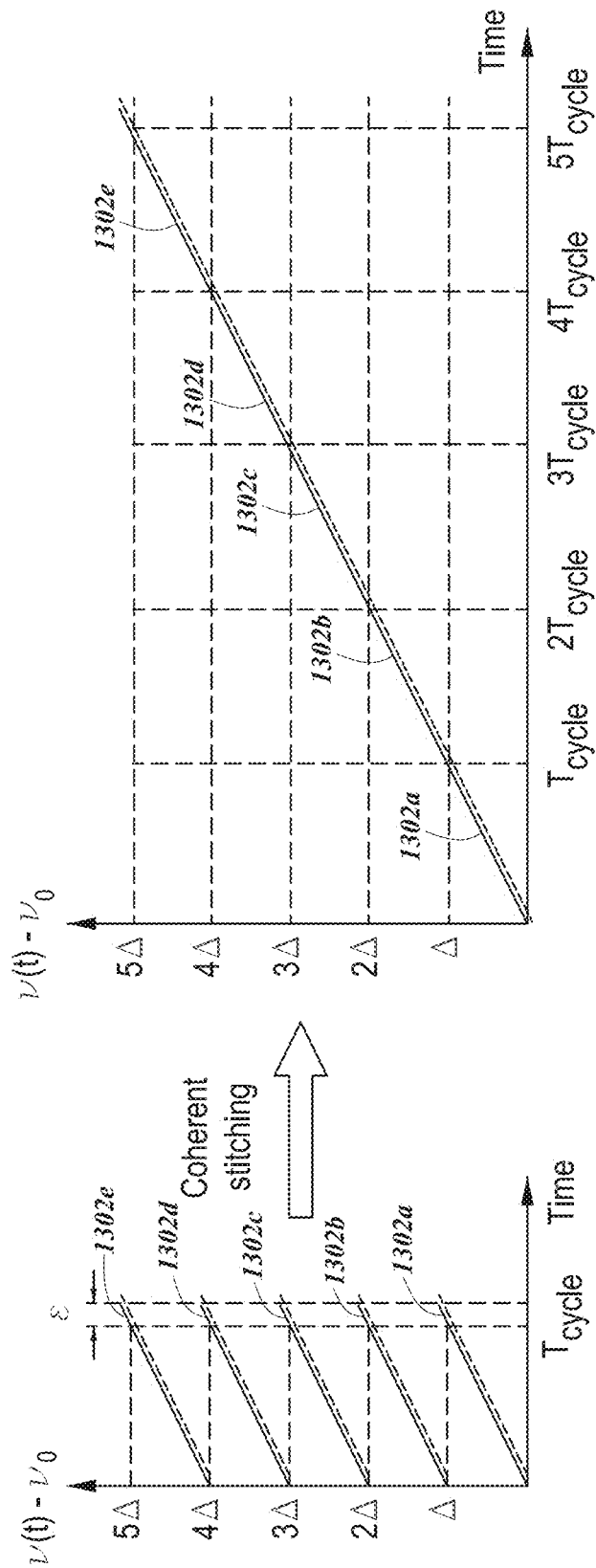

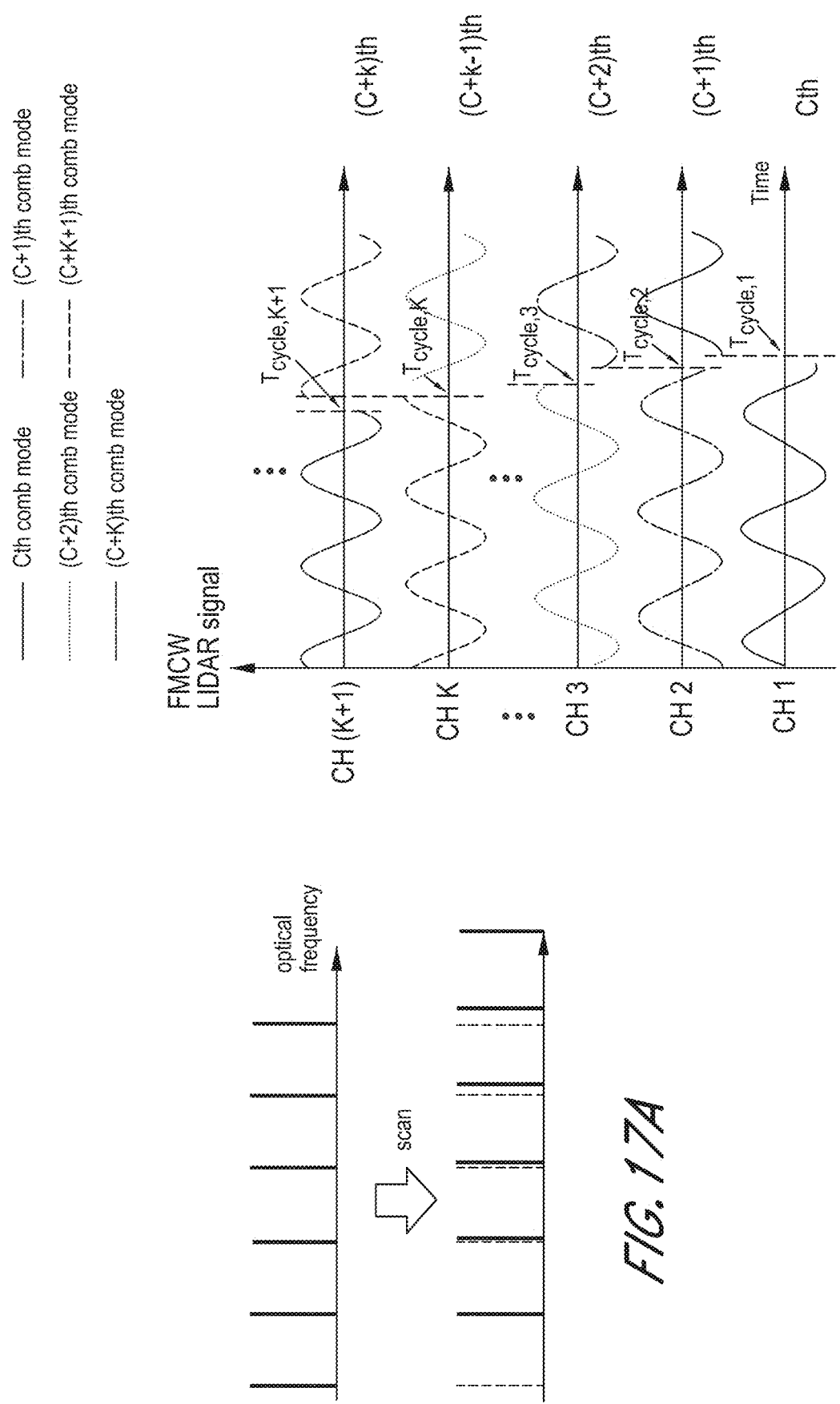

COMPACT MICRORESONATOR FREQUENCY COMB

CROSS-REFERENCE TO RELATED APPLICATIONS

This application is a continuation of Int'l Pat. Appl. No. PCT/US2019/044992 filed Aug. 2, 2019, which claims the benefit of priority to U.S. Provisional Pat. Appl. No. 62/744,862, filed Oct. 12, 2018, U.S. Provisional Pat. Appl. No. 62/769,700, filed Nov. 20, 2018, and U.S. Provisional Pat. Appl. No. 62/824,040, filed Mar. 26, 2019, all of which are hereby incorporated by reference herein in their entireties.

BACKGROUND

Field

The present disclosure relates to the construction and control of ultra-low noise photonics microresonator frequency combs and their applications.

Description of the Related Art

Microresonator (MR) based frequency combs are finding an increasing number of uses in any applications that requires the generation and processing of an electro-magnetic signal, for example comprising broadband wireless and optical communication, radar, test and measurement instrumentation, spectroscopy, or sensing. Systems and methods are disclosed herein, e.g., for control of MR frequency combs.

SUMMARY

Precision microresonator frequency combs can include the control of comb parameters such as comb spacing, carrier envelope offset frequency, resonance offset frequency, or amplitude noise as well initiation of a coherent state. In some application, high bandwidth modulation of comb parameters is also provided.

Various examples of systems and methods for precision control of microresonator (MR) based frequency combs are disclosed. By implementing optimized MR actuators and MR modulators, long-term locking of either of, all of, or any subset of carrier envelope offset frequency, repetition rate, or resonance offset frequency of the MR can be controlled. In addition, the modulators can also be used for amplitude noise control. The various MR parameters can be locked to external reference frequencies such as a continuous wave laser or a microwave reference. The various MR parameters are coupled to each other, but via selection of optimized MR parameters, the cross talk between the MR parameters can be reduced or minimized, facilitating long-term locking. The MR can also be locked to an external two wavelength delayed self-heterodyne interferometer for low noise microwave generation. The MR based frequency comb can be tuned, scanned or modulated by a substantial fraction of the free spectral range (FSR) and by even more than one FSR via application of a feedback control system. Scanning MR frequency combs can be applied to, for example, dead-zone free spectroscopy and multi-wavelength LIDAR. The resolution of any comb based LIDAR system can be greatly enhanced via coherent stitching of individual comb lines. MR based combs can also be utilized in high precision optical clocks and low phase noise microwave sources via the utilization of frequency division and molecular references.

In an example embodiment, a single-sideband modulator is used to control both the comb spacing as well as carrier envelope offset frequency of a comb MR.

In another example embodiment, at least one graphene modulator is used for rapid control of a MR.

In yet another example, the combination of heaters and diode pump current modulation are used for MR control.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIGS. 1A-1D schematically illustrates an embodiment of a scheme for control of a microresonator (MR).

FIG. 13A schematically illustrates an example of the frequency evolution of adjacent comb modes of a comb-based FMCW LIDAR system before coherent stitching.

FIG. 13B schematically illustrates an example of the frequency evolution of adjacent comb modes of a comb-based FMCW LIDAR system after coherent stitching.

FIG. 17A schematically illustrates an example of the modification of the comb mode spectrum of a microresonator when the comb spacing is switched between two different values. The comb mode spectrum for the two values is represented by solid and dotted lines.

FIG. 17B schematically illustrates an example of the temporal signal evolution of the FMCW signals related to individual comb modes of a scanning microresonator comb before the implementation of temporal rescaling, schematically illustrating the variation of the cycle time $T_{cycle}$ as a function of comb mode number.

The figures depict various embodiments of the present disclosure for purposes of illustration and are not intended to be limiting. Wherever practicable, similar or like reference numbers or reference labels may be used in the figures and may indicate similar or like functionality.

DETAILED DESCRIPTION

Overview

Figure 2B:
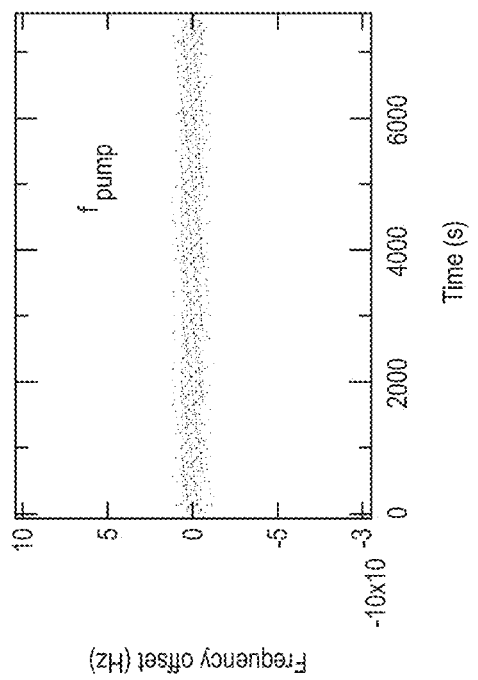
FIG. 2B illustrates an example measurement of frequency stability of a MR comb mode when locked to a fiber comb.

Microresonator (MR) based frequency combs are finding an increasing number of uses in any applications that require the generation and processing of an electro-magnetic signal, for example comprising broadband wireless and optical communication, radar, test and measurement instrumentation, spectroscopy, and sensing. Many of these applications greatly benefit from the availability of frequency combs that allow for control of the repetition rate frep, carrier envelope offset frequency fceo, and/or amplitude noise, resulting in well-defined optical frequencies.

With recent advances in MR-based frequency combs, their precise control becomes increasingly important. Indeed, though MR designs have greatly proliferated, their utility for practical applications can be limited. For true mass applications, MRs based on CMOS compatible technology for potentially chip scale designs are preferred as for example disclosed in B. Stern et al., "Battery operated integrated frequency comb generation", Nature (2018). However, there is still a need for MR frequency combs based on design architectures compatible with chip scale designs that allow for full control of MR comb parameters as well as modulation of MR comb parameters.

Of particular interest are chip scale frequency combs that emit a soliton comb. In contrast to a modulation-instability based comb (chaotic comb), a soliton comb is in a mod-elocked state, producing highly coherent, ultrashort pulses, and a low noise comb. Among various possible comb MR platforms, platforms that enable CMOS-compatible fabrication process, allowing for a chip scale design, are of particular interest. Examples of CMOS compatible fabrication process include for example, silicon nitride (SiN), hydex as well as amorphous silicon, but other examples are also possible.

Generating a stable soliton comb is generally challenging because of fast thermo-optically induced cavity changes when transitioning from a chaotic comb to a soliton comb. To overcome this challenge, several methods have been demonstrated, including for example a rapid frequency scan by a single-sideband modulator (SSBM) composed of a dual-parallel Mach-Zehnder interferometer modulator (DP-MZM) and forward-and-backward pump frequency scanning, as shown in H. Guo et al., "Universal dynamics and deterministic switching of dissipative Kerr solitons in optical microresonators", Nature physics, vol. 13, pp. 94 (2017). Rapid scanning via a SSBM is particularly attractive as it allows single soliton comb generation with high fidelity and no necessity of pump laser modulation.

For an optical frequency comb, fceo and frep are generally determined by pump frequency and pump power control, respectively. After generation of a stable soliton comb with the SSBM, the SSBM can also be used to control the resonance offset frequency ROF, (where ROF is the difference between the pump laser frequency and the cavity resonance frequency) via the use of Pound Dreyer Hall (PDH) locking, as disclosed in J. R. Stone et al., "Thermal and Nonlinear Dissipative-Soliton Dynamics in Kerr-Microresonator Frequency Combs", Phys Rev. Lett., vol. 121, pp. 063902 (2018). The SSBM can also be readily implemented for fceo and frep control. Since two degrees of freedom are generally required for fceo and frep control, an acousto-optic modulator (AOM) is typically inserted just before the MR which allows to regulate the pump power. However, the use of AOMs is generally not compatible with the realization of chip-scale MRs. Moreover, the use of different components for soliton comb initiation, frep and fceo or ROF control increases the cost of such devices and is not practical for large scale applications.

Various alternatives for full microcomb control that limit the component count and are fully compatible with chip scale designs are disclosed herein. As a first alternative, the use of a SSBM not only for a soliton comb generation, but also for both fceo and frep control can be used. In this approach the pump power for a microcomb is controlled via modulating the power distribution between optical sidebands and the residual carrier by changing one of the bias voltages of the SSBM. Modulation of the side-band frequency further allows rapid scanning of the injected light frequency for comb initiation and full $f_{ceo}$ and $f_{rep}$ control. Additionally or alternatively, to reduce noise of the comb repetition rate $f_{rep}$ for a soliton comb without using any external reference, the ROF can be fixed by using PDH locking. For this, pump frequency is controlled by the SSBM.

In a second alternative, graphene modulators deposited on MRs are used for full MR comb control.

In a third alternative, one can use the modulation of the output power of a pump laser via pump current modulation as well as rapid heat modulation of the MR for full frep and fceo control.

Example Working Principle and Example First Embodiment System

The working principle of the 1$^{st}$ alternative is shown in FIGS. 1A-1D. FIG. 1A schematically illustrates a continuous wave (cw) laser that is directed through a DP-MZM, in which pump frequency and power are controlled. Basically, the DP-MZM is operated in the carrier-suppressed single sideband mode. For this mode, both nested upper and lower Mach Zehnder interferometers (MZIs) are properly biased via applying voltages $V_{bias1}$ and $V_{bias2}$, thereby eliminating the optical carrier and leaving two sidebands. Here, the two MZIs are modulated by the same radio frequency (RF) frequency (from a voltage-controlled oscillator (VCO)) but with 90 degree phase difference (using a 90 degree hybrid splitter). Then, by adding a proper bias voltage $V_{bias3}$ in the main MZI, a sideband on either the red or blue side is suppressed, leaving only a single sideband. The single remaining sideband is then used as a pump for the MR. At first, to access a stable single soliton comb, the VCO frequency is quickly tuned by applying a DC voltage ($V_{DC,scan}$) to the VCO, which results in a rapid scan of the pump wavelength from blue to red as shown in FIG. 1B. Once a stable single soliton comb is obtained, the pump frequency and power can be further controlled by applying specific modulation voltages ($V_{m1}$ for pump frequency and $V_{m2}$ for power). For pump frequency control, $V_{m1}$ is added to $V_{DC,scan}$ and applied to the VCO, enabling pump frequency control via VCO frequency changes as shown in FIG. 1C. For power control, $V_{m2}$ is added to $V_{bias1}$. Note that $V_{bias1}$ is intentionally miss-adjusted from the optimum carrier suppression point so that a reasonable voltage change of $V_{m2}$ can change the power distribution between the sidemode and the residual carrier as shown in FIG. 1D. Note the power ratio between the sideband and the residual carrier stays the same even after optical amplification, which can be contrasted with the case where the power of a single carrier is modulated before an optical amplifier. In this case, gain saturation typically limits the possible pump power modulation for the microcomb, and an acousto-optic modulator (AOM) for more substantial power modulation can be used.

Figure 2A:
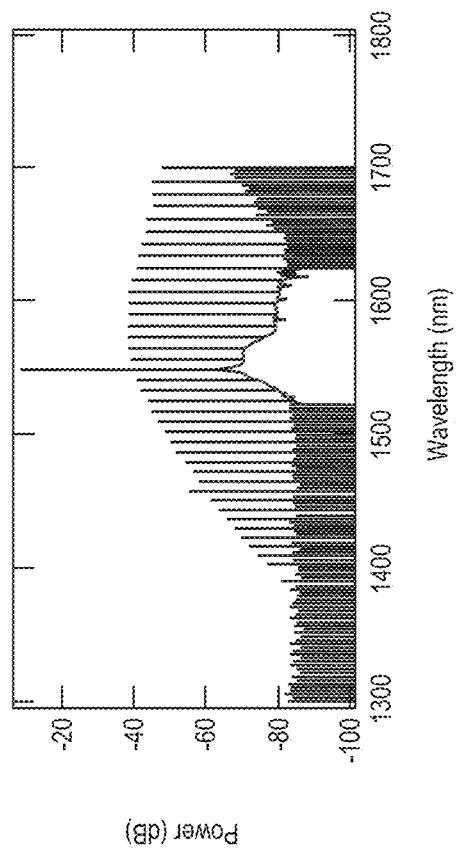
FIG. 2A illustrates an example measurement of the output spectrum from an MR comb.

More specifically, to generate a stable single soliton comb the SSB modulator is set to a frequency where several parametric comb modes are observed. The VCO frequency is then rapidly scanned to produce a pump frequency shifted to the red side of the MR resonance by a few times to 10 times the linewidth of the resonance. This shift is preferably executed within a time period of a few ns to a few tens of ns by applying a DC voltage ($V_{DC,scan}$ in FIG. 1A). An example of the generated optical spectrum obtained with a soliton comb is shown in FIG. 2A.

To demonstrate long-term fceo and frep locking, the MR is locked to a fiber frequency comb. For this locking scheme the beat frequency of one MR comb mode is interfered via a next neighbor comb mode from a fiber frequency comb and the resulting beat frequency is stabilized to a microwave reference via a standard PID feedback loop. The resulting error signal from the PID loop is then applied to either pump power or pump frequency control in the MR. The same procedure is repeated for another MR comb mode. As this locking scheme has two degrees of freedom it is equivalent to simultaneous fceo and frep locking of the resonator. Note the two PID loops are used to actuate on two different control mechanisms in the MR, such as pump power and pump frequency as used here. The two point locking scheme can also be used with other frequency references such as cw lasers or microwave references; for some applications it may be sufficient to lock the MR comb to only one external reference.

For long-term frequency locking, as explained above, the pump frequency is typically detuned to a range between a few times to 10 times the linewidth of the resonance of the microresonator on the red wavelength side of the MR. When a stable soliton is generated, fceo and frep locking is possible in a large range of ROFs. With the two control mechanisms provided by the DP-MZM, long term locking of the MR to the fiber comb is readily demonstrated. As an example, the central frequency ($f_{pump}$) of the MR as a function of time as measured with a frequency counter under locked conditions is shown in FIG. 2B.

Some MR comb application also require the control of the ROF, for example when an external reference is not available or when fceo or frep cannot readily be measured. In such a case, stabilization of at least the ROF and if desired amplitude noise minimization can produce a lower noise soliton comb compared to a free-running soliton comb. For ROF stabilization, PDH locking can be used to lock the pump frequency to the resonance frequency of the cavity. To enable PDH locking, an additional EO phase modulator can be inserted between the DP-MZI and the resonator to produce an error signal. The error signal can then act on an actuator controlling the pump frequency, for example via the DP-MZM. Alternatively, for PDH locking the pump frequency can be modulated and controlled by just one DP-MZM, exploiting its two degrees of freedom as explained above. In order to ensure that the MR remains in the soliton regime, the DP-MZM needs to be set to the correct frequency shift via the VCO in FIGS. 1A-1D while at the same time applying a phase modulation to the cw laser. This can be ensured via applying a two tone RF signal instead of a one tone signal to the VCO. The bias control in the DP-MZM can then be used for locking of the ROF via voltage $V_{m2}$.

For amplitude noise suppression, amplitude noise of the soliton comb is measured by a photo detector and compared with a DC signal to produce an error signal. The error signal is then feedback to an actuator such as the PD-MZM or the pump laser current for pump power control.

Note, that as shown in FIG. 2A, the present MR resonator comb does not cover the bandwidth of an octave, therefore access to the actual $f_{ceo}$ signal cannot be obtained. However, near octave and even octave spanning frequency combs can be generated via optimization of the dispersion in MRs. With such MR combs, the $f_{ceo}$ signal can for example be accessed with a standard f-2f interferometer. When the peak power of the pulses generated in the MRs is not sufficient, a cw laser can be used as a transfer oscillator. For this, two optical beats are measured. The first beat $f_{beat1}$ (fbeat1=(nfrep+fceo)−fcw) is selected between a MR mode and the cw laser, which is to be phase locked (assuming say at zero frequency for simplicity). The second beat $f_{beat2}$ (fbeat2=(mfrep+fceo)−2fcw) is selected between a MR mode and the frequency doubled cw laser, which is equal to the fceo of the MR (fbeat2=(mfrep+fceo)−2fcw=(mfrep+fceo)−2*(nfrep+fceo)=−fceo). Once fceo is detected by either of the above two methods, fceo can be controlled by modulating either pump frequency or power.

Example Second Embodiment System

Figure 3:
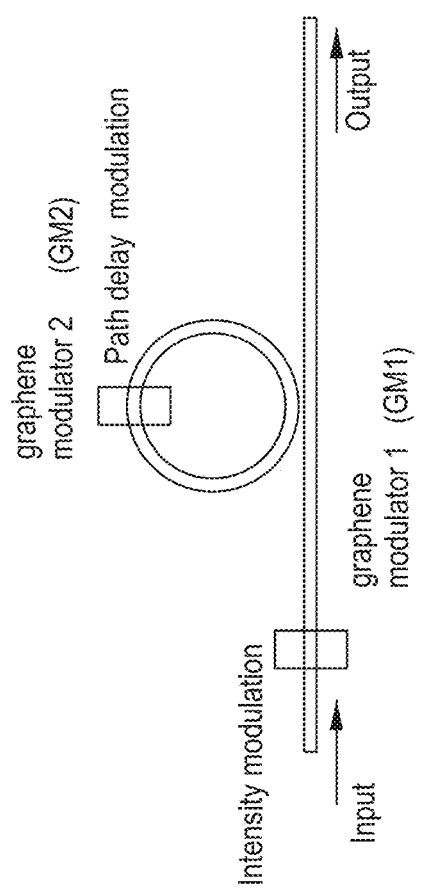
FIG. 3 schematically illustrates an embodiment of a scheme for control of an MR using graphene modulators.

The working principle of the 2nd alternative is illustrated with respect to FIG. 3. Here two graphene modulators deposited on the input arm to the MR as well as the MR itself, are used for full MR control. The MR can for example be based on SiN, polybutylene terephthalate (e.g., hydex), amorphous silicon, diamond, lithium niobate or other materials that allow for the construction of a high Q resonator, where high Q means a Q greater than $10^5$. Graphene modulator #1 (GM1) can be used for control or modulation of the pump power to the MR, whereas graphene modulator #2 (GM2) can be used for control of the resonance frequency of the MR. The employed modulation depth of the pump power can be around a few percent, and the employed range of the resonant frequency control can be up to a few GHz.

Figure 4:
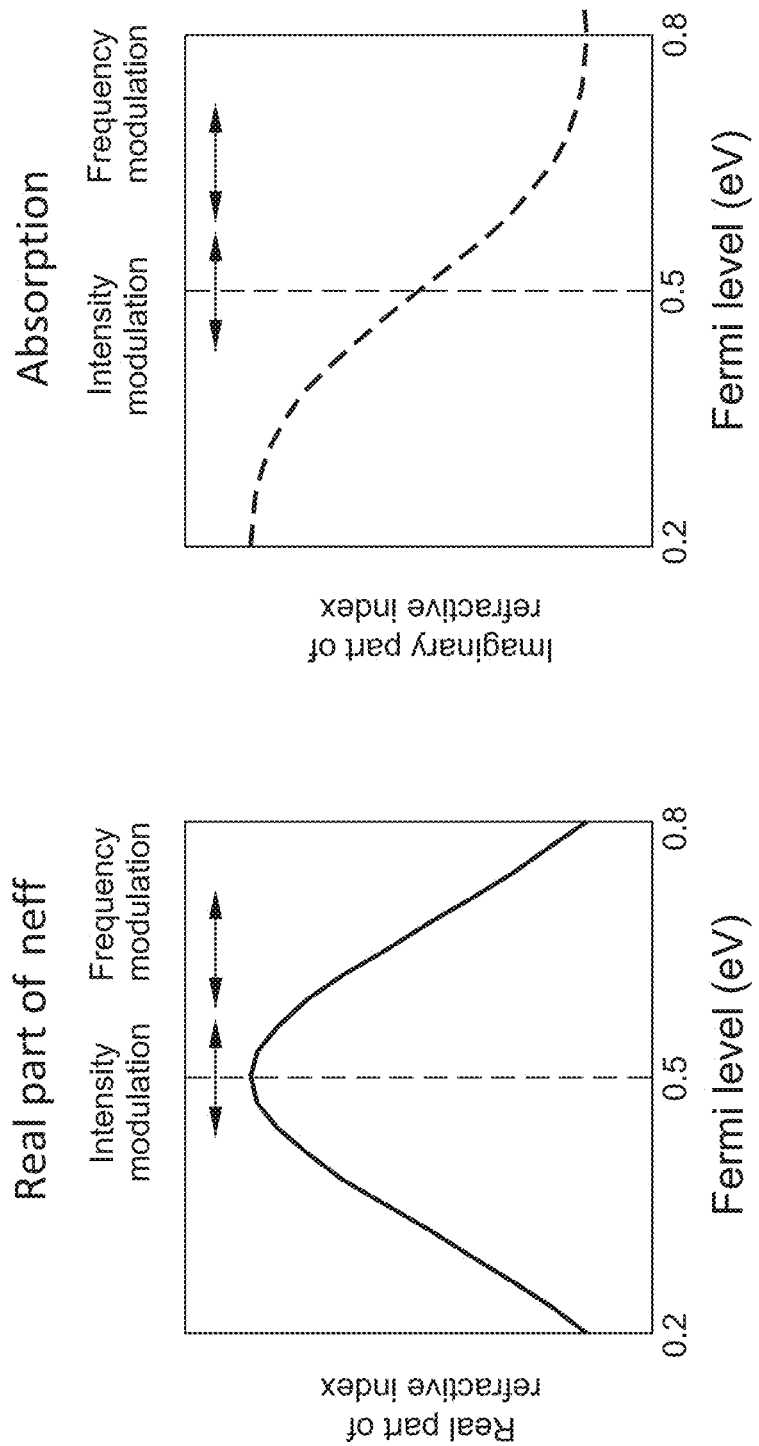
FIG. 4 schematically illustrates an example of preferred graphene bias points when using a graphene modulator for MR control.

The modulation can be performed through a control of the Fermi level in the graphene layer by, for example, forming a dielectric film and a gate electrode on top of the graphene layer and generating an electric field between the gate and the graphene. The change in the electronic band structure of the graphene effects its optical absorption, which corresponds to the imaginary part of the refractive index, and enables the intensity control. For example, absorption of light at a wavelength of 1.55 μm and a photon energy of 0.8 eV is gradually suppressed when the Fermi level of graphene approaches the photon energy of 0.8 eV. On the other hand, the real part of the refractive index is modulated simultaneously through the Kramers-Kronig relation between the real and imaginary part of the refractive index. The relationship is schematically shown in FIG. 4. To allow efficient pump power modulation with GM1, the Fermi level of GM1 is preferably biased at a point where the imaginary refractive index modulation is relatively insensitive to any applied voltage variations, typically around a Fermi level of around 0.5 eV for light with a wavelength of about 1.55 μm. The efficient control of the resonant frequency of the microresonator with GM2 is performed with a slightly lager Fermi level than that for the intensity modulation where the change in the real part of the refractive index is relatively large whereas changes in the imaginary part of the refractive index are small. Examples of the operation ranges are indicated by double sided arrows in FIG. 4. For locking of the ROF, an additional EO phase modulator can be inserted upstream of the resonator for generation of an error signal. The additional EO modulator can also be based on a graphene electro-optic modulator, but any other form of electro-modulation can also be implemented. For actual ROF locking a PDH locking scheme can be implemented, as discussed before, and the error signal can actuate on the intra-cavity graphene modulator or alternatively the frequency of the cw laser coupled into the cavity.

Several methods can be used to attach a graphene modulator to a MR. For example C. T. Phare, et al. in "Graphene electro-optic modulator with 30 GHz bandwidth," Nature Photonics, vol. 9, pp 511-514 (2015) disclosed employing wet transfer of a graphene film onto the MR.

With a graphene modulator deposited on a SiN microresonator a modulation frequency of 30 GHz and higher is achievable. Such a high modulation bandwidth can be used not only for the control of a soliton comb in a MR as described above but also for the generation of a Kurogi-comb. In an adaptation of a MR as a Kurogi comb, sidebands to the cw light injected into the MR are repeatedly generated through repetitive phase modulation in the MR via the graphene modulator. This results in the formation of a comb-like spectrum with a comb spacing at the modulation frequency. The generation of a Kurogi-comb is enhanced when the FSR of the MR and the applied modulation frequency are identical.

Example Third Embodiment System

The working principle of the third alternative is as follows and schematically shown in FIG. 5. Here a pump laser, preferably based on a semiconductor diode laser or amplifier is coupled to a microresonator (MR) via coupling element C1. Coupling element C1 can for example comprise micro-optic lenses or waveguide tapers to optimize the coupling efficiency. The MR also comprises at least one microheater deposited on the MR for rapid heating of the cavity length. For example the microheater can be a resistive microheater based on Pt and Al with a resistance of around 200 Ohms. Such microheaters can be deposited using standard fabrication techniques, such as lift-off processes. Well-designed heaters allow the modulation of MR cavity lengths by $>10^{-4}$ of fractional cavity length change with a modulation bandwidth of >100 kHz.

The microheaters can then be used for initiation of a soliton state similar to the method described with respect to FIGS. 1A-1D. However, whereas in FIGS. 1A-1D, the pump frequency was rapidly modulated, here the cavity length is rapidly modulated. The microheaters in conjunction with pump current modulation are then also used for full control of the fceo and frep of the MR, as also explained with respect to FIGS. 1A-1D.

Control of a pump laser via modulation of the pump current modulates both pump frequency and pump power. On the other hand, microheaters mainly cause modulation of the ROF, equivalent to pump frequency modulation. Because of this, an appropriate selection of the ROF from the MR resonance via micro heaters can minimize cross talk between pump current modulation and microheater modulation.

For example at an appropriate ROF ($ROF_{opt}$), pump frequency modulation can produce minimal changes to fceo while inducing much larger changes to n×frep in the MR, while pump power modulation at $ROF_{opt}$ produces changes to fceo and n×frep of similar magnitude. Here n×frep corresponds to the emission frequency of the MR in the optical domain, which is similar to the frequency of the injected cw laser. Since current changes in the pump laser typically produce both modulations of pump frequency and power, at $ROF_{opt}$, to first order, the fceo changes resulting from pump current modulation induced frequency modulation can be ignored, leaving only the fceo changes resulting from pump current induced power modulations. At the same time pump current modulation induced modulations of n×frep from both pump current induced power and frequency modulations remain. Therefore full control of the MR near $ROF_{opt}$ is preferred, where heater modulation controls mainly n×frep, and pump current modulation controls fceo with minimal cross talk to n×frep.

Generally, even in the optimum case independent frep and fceo control is not possible, but as long as the sensitivity of frep or fceo to a certain actuation parameter is different, long term frep and fceo locking can still be achieved. In addition, appropriate electronic designs based on linear superposition for the two control signals for the two modulators enable to minimize cross talk between pump current and heater modulation.

As discussed with respect to the other two alternatives, PDH locking of the ROF can also be implemented. To enable PDH locking, the ROF can be controlled via the micro-heaters and the pump frequency of the cw laser can be directly modulated. However, additional modulators or cavity length controllers, as discussed with respect to alternatives one and two can also be used.

Additionally or alternatively, a two wavelength delayed self-heterodyne interferometer, e.g., as discussed in U.S. Patent Publication No. 2018/0180655, Ultra-low noise photonic phase noise measurement system for microwave signals, to N. Kuse et al. (which is hereby incorporated by reference herein in its entirety) can be used to suppress phase noise of frep. In the same way, any modulators and actuators described herein can be used to control frep when locking frep of a MR to a two wavelength delayed self-heterodyne interferometer. Moreover, the use of a two-wavelength delayed self-heterodyne interferometer for reduction or minimization of the phase noise of frep can be used with any MR.

As described with respect to alternatives one and two, the pump frequency/power modulation described here can also be used for intensity noise suppression of the comb MR. In this the error signal from the PI loop filter can be feedback to control either pump frequency or power for the desired amplitude noise suppression. Amplitude noise suppression can for example be useful to suppress the timing jitter of the pulses generated in the MR.

Figure 5:
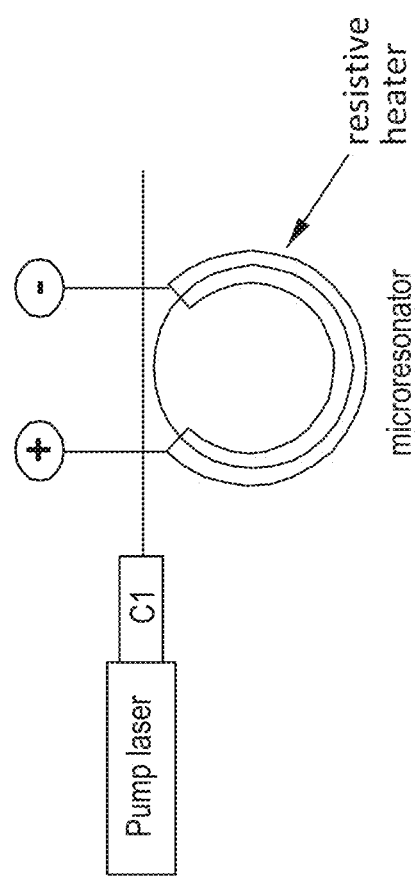
FIG. 5 schematically illustrates an embodiment of a scheme for control of a microresonator using a semiconductor laser in conjunction with micro-heaters.

With sufficient heating current applied to the system shown in FIG. 5, the fractional cavity length tuning range can reach >$10^{-3}$. Such a large fractional cavity length change can correspond to a shift of the comb lines in the optical domain by more than one free spectral range (FSR). However, in some applications, a fractional cavity length tuning range of only 50% of the FSR, or only 10% of the FSR, or only 5% of the FSR can be used. In various configurations a modulation mechanism (such as, e.g., MR heating) applied to an MR can produce a frequency shift of the comb lines by more than one FSR for a resonator repetition frequency <20 GHz, <100 GHz, <300 GHz and even <1 THz, opening up a range of novel applications. However, generally, when applying such large repetition rate changes, it may be challenging to preserve the oscillation of a soliton comb inside the resonator. For example, M. Yu et al. in "Gas-phase MR-based comb spectroscopy without an external pump laser", arXiv:1806.01348v1, demonstrated tuning of the comb lines of a 195 GHz MR by around one FSR, but the oscillation of a soliton comb was not achievable. Rather a chaotic comb with a broad linewidth similar to the linewidth of the MR comb was observed, even when coupling the MR to an external fiber resonator with a FSR of around 5.2 MHz.

This challenge may be addressed, for example, by scanning the FSR of the MR and the pump frequency simultaneously. As discussed with respect to the above three example embodiment systems described with reference to FIGS. 1-5, PDH locking can be implemented to stabilize the ROF and to lock the cw pump laser to the MR. When PDH locking is activated, the pump laser remains locked to the ROF frequency and thus the pump laser can follow the variation of the cavity modes when ramping (or arbitrarily modulating) the temperature of the MR with the microheaters. Additionally or alternatively, the system can be configured such that the heaters enable locking of the ROF when ramping (or arbitrarily modulating) of the cw pump laser is applied.

In some embodiments, when applying the PDH method to produce a soliton comb, the pump frequency is fixed at the red side of the MR resonance, e.g., a sideband from a phase modulator employed for PDH locking is fixed at the resonance. However, in some implementation, the pump frequency can also be on the blue side of the MR resonance.

Example MR Scanning System Using PDH Locking

Figure 6:
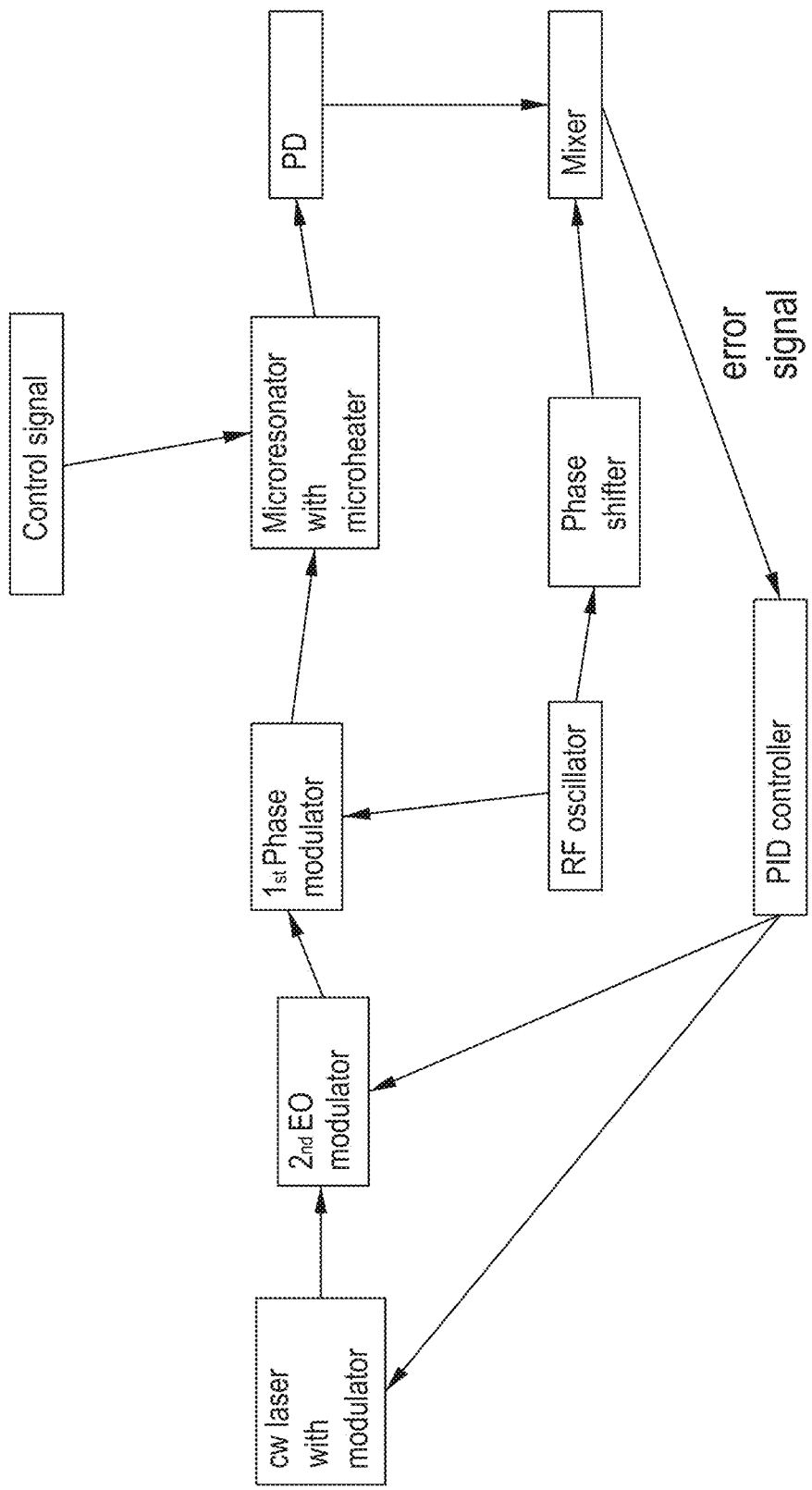
FIG. 6 schematically illustrates an embodiment of a system for precision wavelength scanning of a microresonator using a semiconductor laser in conjunction with micro-heaters.

A schematic block diagram for an implementation of a rapid MR scanning system using PDH locking is shown in FIG. 6. To enable PDH locking of the MR, a $1^{st}$ phase modulator (PM) is inserted between the cw MR pump laser (with optional modulator) and the MR. The $1^{st}$ phase modulator can for example be based on an electro-optic (EO) PM. The $1^{st}$ PM can be driven by an RF frequency from an RF oscillator, which can (but need not) be exactly the same as the detuning between the pump and the nearest resonance frequency. The $1^{st}$ PM generates sidebands on both sides of the pump laser, where the sideband on the blue side of the pump laser frequency can be locked to the nearest resonance frequency by the PDH lock.

Figure 7:
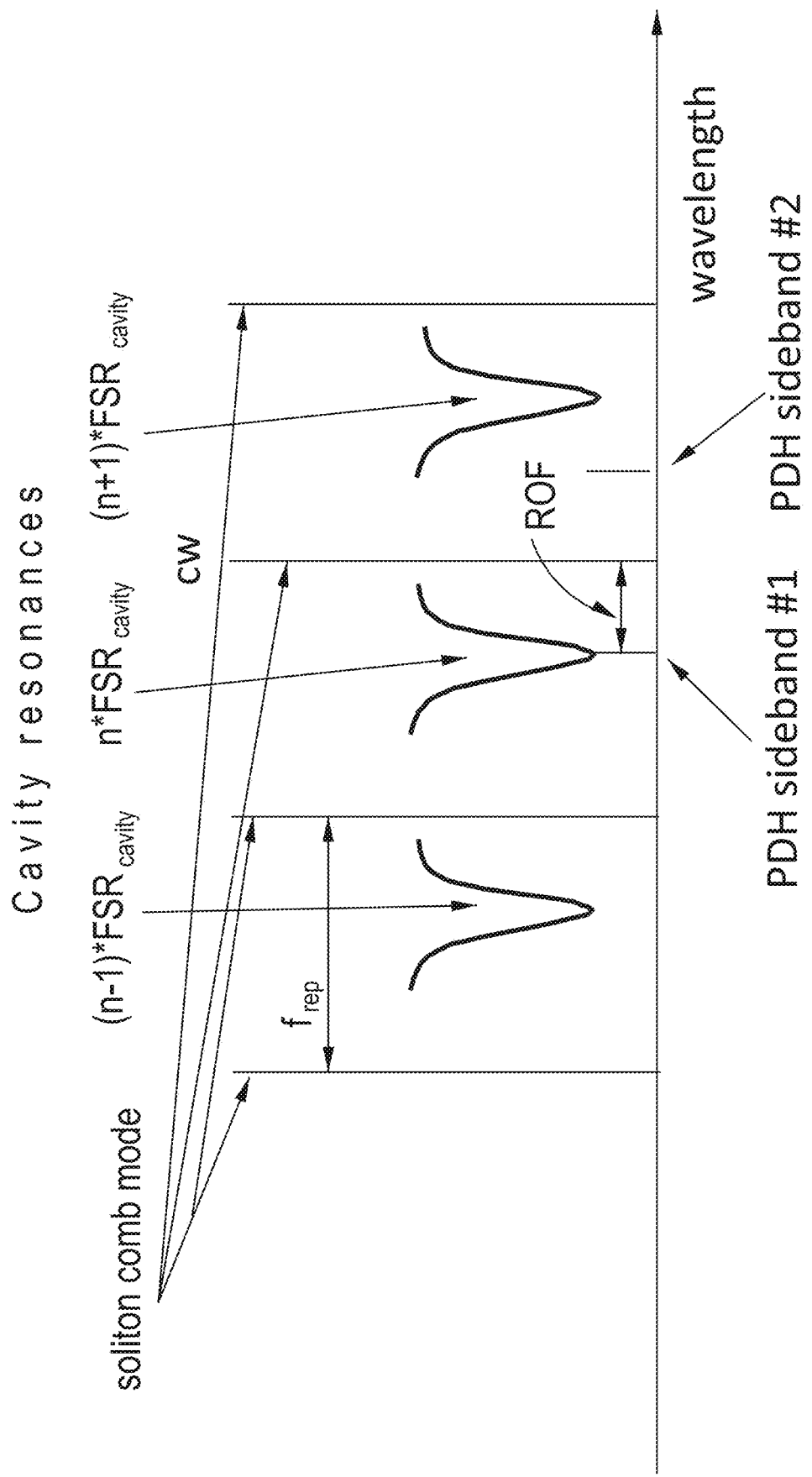
FIG. 7 schematically illustrates various frequencies that may be involved in microresonator wavelength scanning.

For illustration, frequencies involved in the scanning process are further explained with reference to FIG. 7. In this example, a cw laser frequency is located at a red side of a cavity resonance, n*FSR. Dual sidebands are generated by the $1^{st}$ phase modulator for PDH locking. The blue-side sideband, PDH sideband #1, is fixed at the cavity resonance through PDH locking. The FSR of the cavity is approximately equal to the soliton comb mode spacing, frep. The ROF corresponds to the separation between the cw laser and PDH sideband #1 in frequency space.

Referring back to FIG. 6, the signal transmitted by the MR is photo-detected with photodetector PD. A signal from the PD is mixed via an RF mixer and a phase shifter with the RF modulation frequency applied to the $1^{st}$ PM (from the RF oscillator shown in FIG. 6) for demodulation purposes, creating an error signal. The error signal is fed back via a proportional-integral-derivative (PID) controller to a $2^{nd}$ modulator (e.g., an EO modulator), which can for example comprise the pump laser or $V_{m1}$ for a DP-MZM, as shown in FIGS. 1A-1D. When the resonance frequency of the MR is scanned by, for example, a microheater, the pump frequency follows the MR with a fixed ROF when the feedback loop with the PID controller is activated. In this implementation, the PID controller ensures that the $2^{nd}$ EO modulator shifts the cw laser frequency by an appropriate amount for the ROF to stay essentially fixed.

In an alternative configuration (not separately shown), when the cw pump frequency is scanned, the MR resonance frequency follows the pump frequency, thus fixing the ROF, by feeding back the error signal to for example a microheater. In both cases a feedback bandwidth of >10 kHz, >100 kHz, or even > several hundred kHz can be achieved, possibly limited by the thermal response time of the microheaters or the pump laser response time. With the implementation of faster modulators, such as graphene modulators as described with reference to FIG. 3, even higher feedback bandwidths can be achieved.

The frequency ramp, e.g., the change of the cw pump frequency per unit time, of the soliton comb modes in the optical domain can be precisely controlled. Moreover, the frequency ramp is approximately the same across the whole soliton comb spectrum, but for a relatively small change of $f_{rep}$. If ROF is selected near $ROF_{opt}$, the changes in fceo during the scanning operation can be reduced or minimized.

Figure 8:
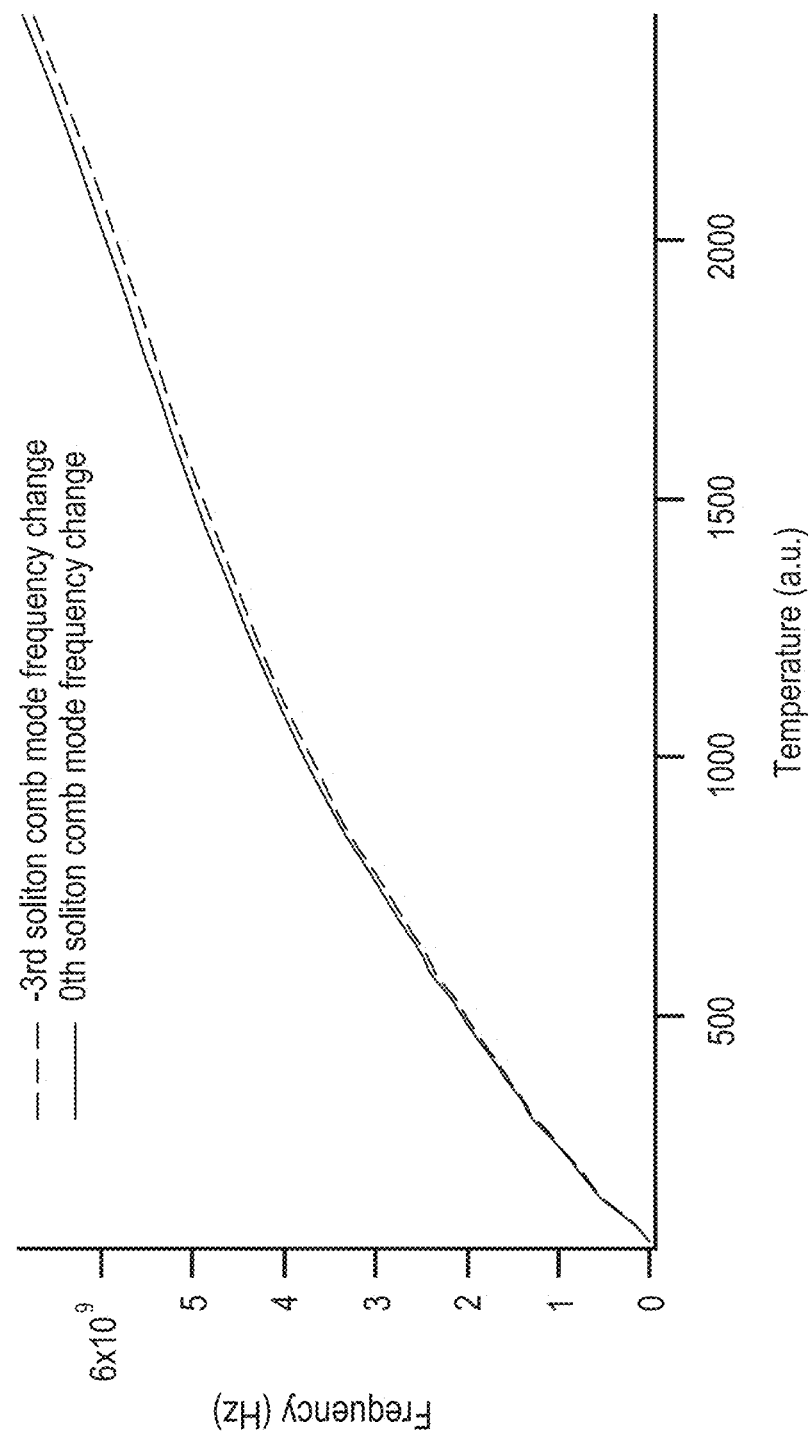
FIG. 8 schematically illustrates an example of the variation of comb mode frequency versus temperature obtained from a wavelength scanning embodiment.

An example measurement of a wavelength sweep enabled via heating of an MR is shown in FIG. 8. Here the temperature of the MR is changed and a PDH lock is activated. In FIG. 8, the variation of the frequencies of the $-3^{rd}$ (dashed line) and the $0^{th}$ (solid line) soliton comb modes are shown, demonstrating that indeed the frequency change per unit temperature change is very similar across the soliton comb spectrum. The total wavelength sweep in this example is around 7 GHz. The small discrepancy is believed to arise from the different mode numbers employed.

With appropriate microheaters (e.g., as explained with reference to FIG. 5) the method explained above allows scanning of the soliton comb mode by more than one FSR, enabling many novel applications. Some applications require the application of a highly linear frequency ramp or an arbitrarily selectable frequency ramp. Such a frequency ramp can for example be applied via external calibration of the frequency ramp using an external frequency comb. After initial calibration, the external frequency comb can be removed, and the desired frequency ramp retained due to the high precision with which the frequency ramp is determined by the micro-heaters. Alternatively, with real time monitoring of $f_{ceo}$ and $f_{rep}$, a highly linear frequency ramp or an arbitrary selectable frequency ramp can be obtained.

If real time control of the frequency ramp is desired, an additional imbalanced Mach-Zehnder interferometer (not separately shown) can be inserted between the cw laser and the $1^{st}$ PM shown in FIG. 6, and the beat signal between the cw laser signal and its time delayed version can be fed back to the cw laser via mixing with an external reference signal. Such a scheme was for example, discussed in N. Satyan et al., "Precise control of broadband frequency chirps using optoelectronic feedback", Opt. Expr., 17, 15991 (2009) and is not further discussed here.

In the following, a few applications are described in detail, but it is understood that the above modulation scheme, which may be referred to as wide bandwidth MR sweeping (WIMS), is not limited to these applications but can be applied whenever the simultaneous modulation of many spectral lines is useful.

Example Application of WIMS to Dead-Zone Free Spectroscopy

Figure 9:
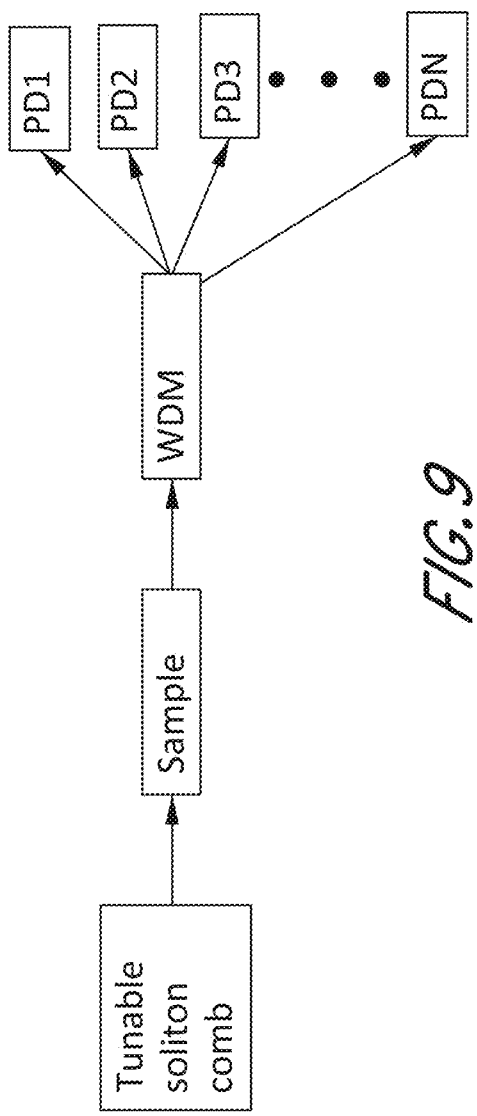
FIG. 9 schematically illustrates an embodiment of a system for spectroscopic measurements using a wavelength scanning microresonator.

In a first example, an application of WIMS to dead-zone free spectroscopy is described with reference to FIG. 9. In dead-zone free spectroscopy, a sample under test is inserted downstream from the scanning MR, and the sample is followed downstream by a wavelength division multiplexer (WDM) to separate each soliton comb mode. The MR may be scanned by a large fraction of the FSR, the FSR, or even by an amount exceeding the FSR of the MR. The separated soliton comb modes can be photo-detected by a photodetector array PD1 to PDN (where N can be 1, 2, 3, or more). Such photodetectors arrays can also comprise charge coupled devices (CCDs). By stitching the obtained signals from each PD in the array, full spectral information of the sample over the full spectral bandwidth of the soliton comb can be obtained. To add an absolute frequency axis, a self-referenced soliton comb can be used, allowing a readout of $f_{ceo}$ and $f_{rep}$ with counters in real time. Additionally or alternatively, a known frequency reference (such as an acetylene absorption line, not separately shown) can be used for frequency calibration purposes. Since the comb mode scan can be fast and the required scan range may only be one FSR, unlike when trying to cover the whole spectral range with the use of just a cw laser, rapid signal acquisition can be obtained. In addition, the frequency resolution may be simply determined by the acquisition time, which may be much higher than possible with conventional optical spectrum analyzers (e.g., ~4 GHz). Moreover, for increased sensitivity, modulation spectroscopy methods can be implemented, where the comb modes are scanned via an applied modulation frequency to the cw laser and the detected signal from each detector is demodulated with that same modulation frequency via a mixer and a low pass filter to increase the signal to noise ratio. An advantage of using WIMS for modulational spectroscopy is that a large spectral range can be simultaneously covered. Moreover, WIMS can be used also in the mid-infrared (mid-IR) spectral range via the use of appropriate soliton combs operating in the mid-IR.

Example Applications of WIMS to LIDAR

Figure 10:
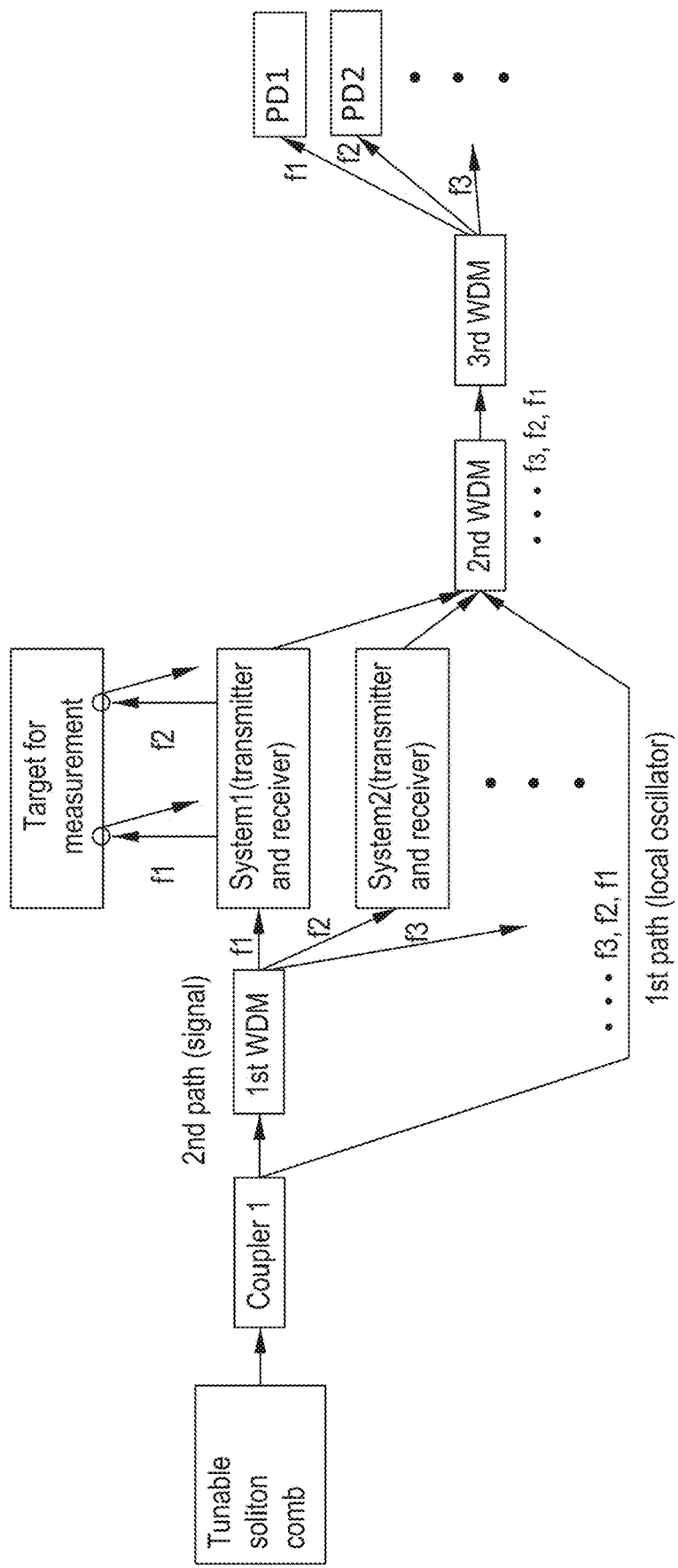
FIG. 10 schematically illustrates an example of a LIDAR detection system using a wavelength scanning microresonator.

In a second example application, WIMS can be used as a multiwavelength laser source for multiwavelength LIDAR or multi-wavelength frequency modulated continuous wave (FMCW) LIDAR, as described with reference to FIG. 10. Conventionally, FMCW LIDAR is used for distance measurements, where a single or an array of independent cw lasers is used. When a saw-tooth frequency modulation is applied to the cw lasers, the distance and the speed of a target object can be extracted by measurement of the beat between the modulated local- and returned signal. When using WIMS, each comb mode of a soliton comb can be used as a cw laser for FMCW LIDAR since the frequency of each comb mode can be scanned approximately equally and simultaneously.

Figure 11:
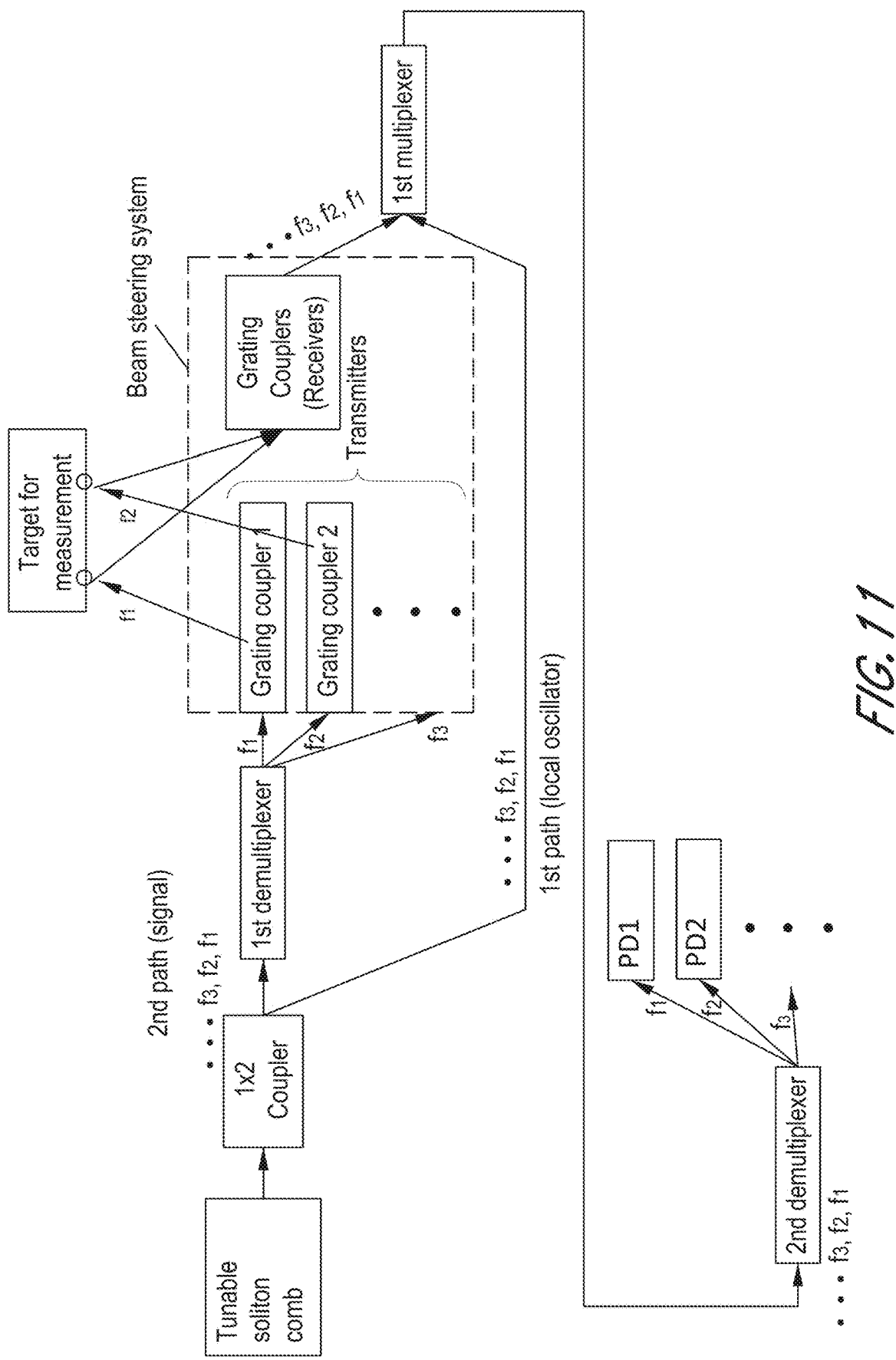
FIG. 11 schematically illustrates another example of a LIDAR detection system using a wavelength scanning microresonator.

The general concept of WIMS-based FMCW comb LIDAR is further described with reference to FIG. 10. The output of the soliton comb is split along two paths by optical coupler 1, where the comb modes directed along a first path are used as a local oscillator, and the comb modes directed along a second path are employed as signal. The signal comb modes are separated by a $1^{st}$ WDM system into a number of channels and are subsequently directed to a beam steering system which can include transmitters and receivers. FIG. 11, described below, shows an example of the beam steering system. The transmitters and the receivers can be, for example, grating couplers, phased arrays, mechanical scanning devices such as galvanometer scanning devices or microelectromechanical semiconductor (MEMS) systems.

The emitted signals by the transmitters are reflected at a target and collected with receivers. The received signal mode and the local oscillator modes are first interfered via a $2^{nd}$ WDM system and the individual channels are separated with a $3^{rd}$ WDM system. The individual channels are detected with an array of photo-detectors (PD1 . . . PDN). The individual channels can for example be selected to have the same channel allocation as determined by the $1^{st}$ WDM. In some implementation, the $2^{nd}$ and $3^{rd}$ WDM systems can be combined into one system. Alternatively, the $2^{nd}$ WDM system can also be substituted with an optical coupler. The detected beat signals at the PDs contain distance and velocity information of the target obtained from each signal mode with different frequency. Each comb mode can provide distance information at different points of the target by changing the direction of emission (e.g., via the beam steering system) depending on the frequency.

An embodiment of a comb scanning system is further described with reference to FIG. 11. The output of the soliton comb is split along two paths by a 1×2 optical coupler, where the comb modes directed along a first path are used as a local oscillator and the comb modes directed along a second path are employed as a signal. The signal comb modes are separated by a $1^{st}$ WDM demultiplexer, which can be based on an arrayed waveguide grating (AWG), into a number of channels and are subsequently directed to a beam steering system comprising grating couplers, which can be composed of one dimensional periodic dielectric structures and designed so that the couplers emit light vertically (as shown in FIG. 11). Such vertical emitting grating couplers and AWGs can be integrated on a chip based on silicon photonics fabrication techniques. The grating couplers emit signal light vertically (as shown in FIG. 11) toward a target where the direction of the emission can be controlled by heating the devices.

The emitted signals are reflected at the target and collected with receiver grating couplers which are designed so that they collect light coming from vertical directions (as shown in FIG. 11). The received signal modes and the local oscillator modes are first interfered via a $1^{st}$ WDM multiplexer and the individual channels are separated with a $2^{nd}$ WDM demultiplexer where both multiplexer and demultiplexer can be composed of AWGs. The individual channels are detected with an array of photo-detectors (PD1, PD2, . . . ). The individual channels can have the same channel allocation as determined by the $1^{st}$ demultiplexer. The detected beat signals at the PDs contain distance and velocity information of the target obtained from each signal mode with different frequency.

A saw-tooth frequency modulation can be continuously applied to the soliton comb by WIMS during the measurement, where a typical modulation depth may be selected in a range from 1-100 GHz. In some embodiments, up to 10 channels can so be utilized. In some applications the channel count can exceed 100, where the individual channel spacing can be selected between 10-100 GHz. Other channel spacings and an even higher number of channels can also be implemented. Moreover, in conjunction with chip-scale MR combs and chip-scale assemblies of multiplexers and de-multiplexers as well as photodetectors, for example in silicon photonics, ultra-compact chip-scale LIDAR systems can be realized with the utilization of WIMS.

Simultaneous scanning of many comb modes over substantial frequency ranges without loss of soliton operation in a MR is useful not only for spectroscopy or LIDAR, but can also be implemented for any other applications. As discussed above simultaneous control of the FSR of an MR and pump frequency can be implemented for preserving soliton operation during wide bandwidth MR sweeping, where any form of simultaneous control of the FSR and pump frequency can be utilized. FSR scanning by more than 5% of the FSR, more than 10% of the FSR, more than 50% of the FSR, and even more than 100% of the FSR can be implemented. For example, such systems can be configured such that heaters enable modulation of the FSR while simultaneously modulation of the cw pump laser power or frequency is implemented. Appropriate feedback loops can be implemented to ensure that such systems stay operating in the soliton mode. For example, as also discussed above, the feedback loop can operate on the pump laser power or frequency. The pump laser can then follow the variation of the cavity modes when ramping (or arbitrarily modulating) the temperature of the MR with the microheaters. As another example the system can be configured such that the heaters enable modulation of the FSR of the MR while modulation of the cw pump laser frequency is applied. A feedback loop can then be used to stabilize the output power of the MR during the scanning process. Such permutations of MR scanning systems are not separately shown here. Alternatively, applications in spectroscopy or LIDAR are compatible with scanning of an electro-optic comb (EO comb), as for example disclosed in WO 2016/164263A1, Systems and methods for low noise frequency multiplication, division, and synchronization, to M. E. Fermann et al., which is hereby incorporated by reference herein in its entirety. Such EO combs also allow for simultaneous scanning of many comb modes over substantial frequency ranges. Other applications of scanning MR combs and electro-optic combs are also possible.

Example Applications of WIMS to High Resolution LIDAR

WIMS produces highly correlated frequency scans between the individual comb lines of aw MR, as evident from the example shown in FIG. 8. This high degree of correlation can be utilized to greatly expand the spatial resolution of a LIDAR system via coherently stitching together the frequency scans of individual comb lines. This is further explained below.

Figure 12:
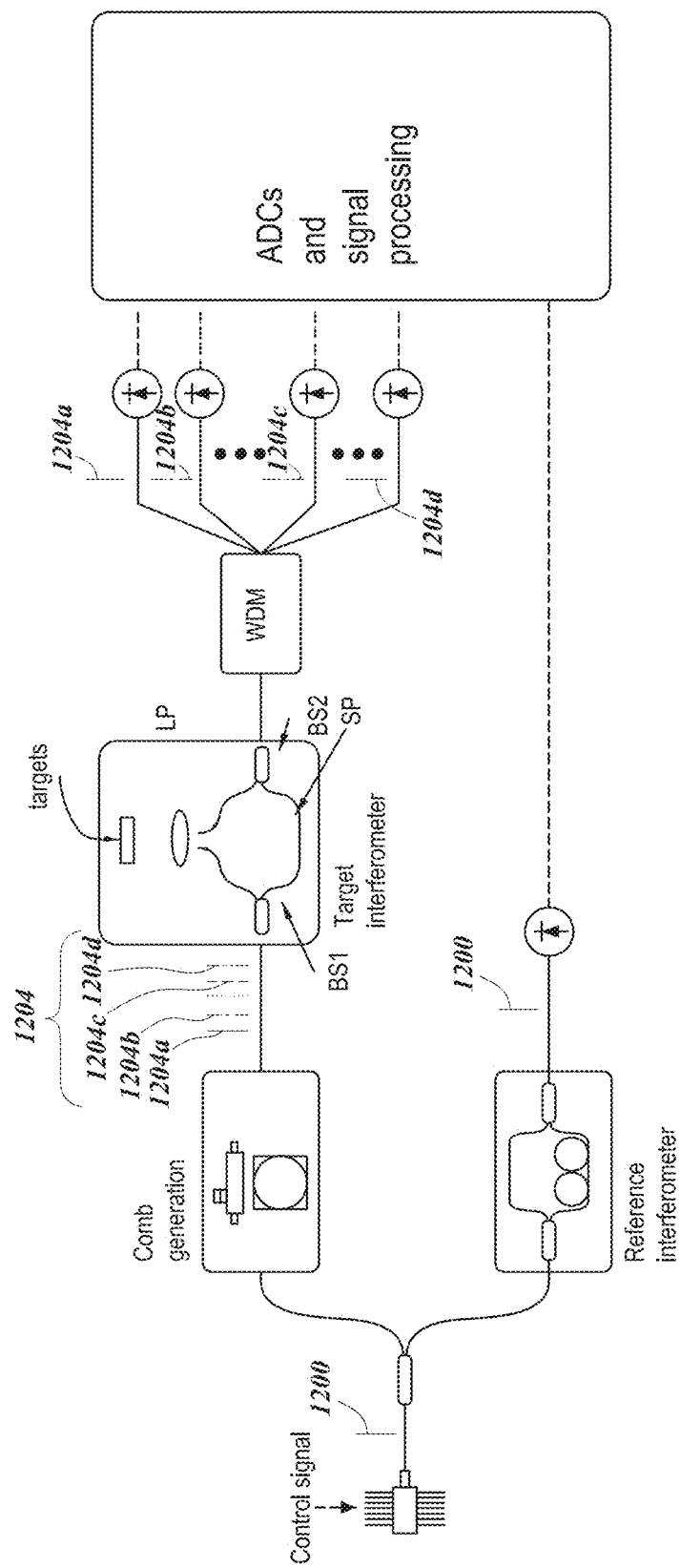
FIG. 12 schematically illustrates an example of a coherently stitched comb-based frequency modulated continuous wave (FMCW) LIDAR system.

To obtain the chirp rate and the instantaneous frequency of individual comb modes a reference interferometer with a known delay can be used. The interferometer can be implemented not only for coherent stitching, but also for corrections to nonlinear frequency scanning. An example system to realize coherently stitched comb LIDAR is shown in FIG. 12. The system starts with a control signal generated by, e.g., a frequency-scanned cw laser (with a center frequency of $v_0$ shown as vertical line 1200), which is split along two paths. One path contains a reference interferometer, which is described further herein in more detail. The other path is used to generate a frequency comb 1204 (for example an MR comb as described with respect to FIGS. 1-9 or an electro-optic (EO) comb as for example disclosed in WO 2016/164263A1, Systems and methods for low noise frequency multiplication, division, and synchronization, to M. E. Fermann et al., which is hereby incorporated by reference herein in its entirety) with a comb spacing of Δ. Examples of individual comb lines 1204a, 1204b, 1204c, and 1204d are shown in FIG. 12.

The frequency comb 1204 is directed to a target, which here for simplicity is shown as a target interferometer (e.g., a Mach Zehnder interferometer). The target interferometer comprises a 1st beam splitter (BS1), splitting the beam along a short path (SP) and a long path (LP). The long path can further comprise a target shown in FIG. 12, which may comprise, for example, two reflectors (or an arbitrary number of scattering objects or targets for a general sample) located at slightly different distances (to evaluate possible resolution). The signal propagating along the short and long paths are recombined in a second beam splitter (BS2) before being directed to a wavelength division multiplexer (WDM). The WDM is used to separate the signals corresponding to the individual comb lines 1204a-1204d. For example the K-th channel of the WDM passes light with an optical frequency between $v_0+(K-1)\Delta$ and $v_0+K\Delta$. The separated WDM channels containing the separated comb modes can be photo-detected with individual photodetectors and digitized with analog to digital converters (ADCs) for signal processing. A signal from the reference interferometer can be photodetected with a reference detector (e.g., a photodetector downstream from the reference interferometer as shown in FIG. 12) and used in the signal processing as further described below.

FIG. 13A shows an example of the instantaneous frequencies 1302a, 1302b, 1302c, 1302d, and 1302e of the comb modes with frequency scanning. Here, for simplicity, we assume the comb spacing A of the frequency comb is fixed and the carrier envelope offset frequency is scanned, which can be implemented for EO combs. Also, for simplicity, we assume that frequency scanning is purely linear, i.e., that the frequency change per unit time is constant. Here the solid lines represent the evolution of frequency for the individual comb lines measured at the MR. The dashed lines represent the frequency evolution after reflection from a target (for simplicity only one target is assumed). The beat signal related to FMCW LIDAR is observed between the solid line and the dashed line.

Preferably the comb modes are scanned by a small amount in excess of the comb spacing, producing a frequency overlap between the (K−1)th and the (K−2)th comb modes in the Kth channel. The dashed vertical lines in FIG. 13A show the scan in excess of the comb spacing, e.g., over a time period ε.

Figures 14A, 14B:
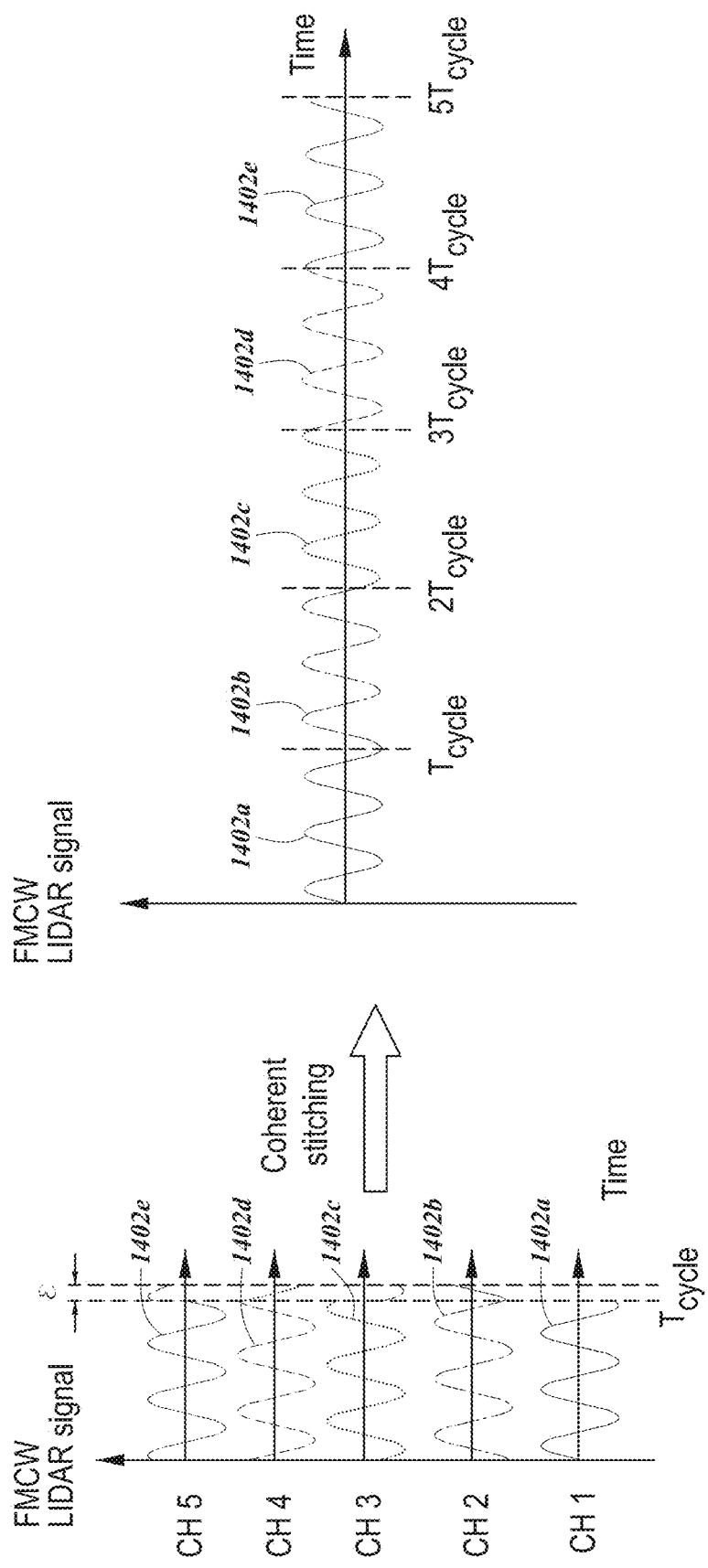
FIG. 14A schematically illustrates an example of the temporal evolution of the beat signals related to adjacent comb modes of a comb-based FMCW LIDAR system before coherent stitching.
FIG. 14B schematically illustrates an example of the temporal evolution of the beat signals related to adjacent comb modes of a comb-based FMCW LIDAR system after coherent stitching.

If the time it takes for the comb scanning to reach the comb spacing is known, all comb modes can be coherently stitched as shown schematically in FIG. 13B. FIGS. 14A and 14B show the working principle using FMCW LIDAR signals 1402a, 1402b, 1402c, 1402d, and 1402e in the time domain. Because of the small frequency overlap at the peripheries of each WDM channel, the Kth channel sees the same signal at the end of the scan range during a short time period ε (preferably selected to be small compared to the cycle time $T_{cycle}$) as at the beginning of the scan; specifically, the Kth channel sees the same signal at time=0+t and time=$T_{cycle}$+t (0<=t<ε). In various embodiments, the time period ε may be less than about 0.1 $T_{cycle}$, less than about 0.05 $T_{cycle}$, less than about 0.01 $T_{cycle}$, or some other value.

A FMCW LIDAR signal with length of N×$T_{cycle}$ can be obtained by coherently stitching FMCW LIDAR signals as follows: the 1$^{st}$ channel covers the time for 0–$T_{cycle}$, the 2$^{nd}$ channel for $T_{cycle}$–2$T_{cycle}$ . . . , and the Nth channel covers the time for (N−1)$T_{cycle}$–N$T_{cycle}$. By coherently stitching a frequency comb with N comb modes, despite an actual scan range of the cw laser of only around one comb spacing Δ, an N times larger effective frequency scan can be obtained, enhancing the obtainable resolution of the LIDAR system by N times. Hence both high resolution and a large coherence length can be obtained when using for example a distributed feedback (DFB) based cw laser in conjunction with a frequency comb in such a LIDAR system. Moreover, compared to a standard frequency modulated LIDAR system, the same scan range can be obtained in an N times shorter scan time.

Referring back to FIG. 12, the function of the reference interferometer is explained in more detail. The reference interferometer can for example comprise a Mach-Zehnder interferometer with a known delay $\tau_{ref}$. Moreover, the reference interferometer can also be used to accurately monitor the frequency scan as a function of time via observation of the beat signal on the reference detector. For example, the observable beat note frequency on the reference detector as a function of time is given by approximately $f_{beat}(t)=d\xi(t)/dt*\tau_{ref}$ where $d\xi(t)/dt$ is the time-variation in frequency of the comb mode. The beat note frequency $f_{beat}$ (t) can be conveniently monitored by recording the distance between zero crossings of the signal from the reference interferometer and resampling the target interferometer at the time of the zero crossings. Interpolation between the zero-crossings can also be used for higher resolution. Such resampling methods are for example described in T. Zhang et al., "Nonlinear error correction for FMCW LADAR by the amplitude modulation method", Opt. Expr., vol. 26, pp. 11510 (2018). To improve the accuracy of FMCW LIDAR with time varying frequency scans, more than one reference interferometer can be used. Such an implementation is not separately shown.

Alternatively, the beat signal observed with the reference frequency can be stabilized via phase locking to a local oscillator frequency reference via feeding back to the laser current, thereby actively linearizing the cw laser pulse chirp. Examples of such methods are discussed by T. Zhang et al.

With the known delay $T_{ref}$ in the reference interferometer, the cycle time $T_{cycle}$ can be obtained in advance as $$T_{cycle} = \frac{\Delta}{f_{beat,ref}} \cdot \tau_{ref}$$

Here, $f_{beat,ref}$ is a corrected frequency of the FMCW LAR signal for the reference interferometer, assuming linear scanning. Under standard laboratory conditions or with temperature stabilization, a reference interferometer constructed from a fiber interferometer can produce 6 digits of accuracy ($10^{-6}$) for the delay ($\tau_{ref}$), because the thermal expansion coefficient of silica fiber is about $10^{-5}$/K.

A parameter to help ensure correct coherent stitching is the phase mismatch between the phase $\varphi_k(t)$ of the beat signal (generated by a target) at time t and the phase $\varphi_k(t+T_{cycle})$ of the beat signal at time $t+T_{cycle}$ (0<=t<ε). Ideally, $\varphi_k(t)-\varphi_k(t+T_{cycle})<+/-\pi$, which enables correct coherent stitching via signal processing. Once the phase mismatch $C=\varphi_k(t)-\varphi_k(t+T_{cycle})$ is known to within +/−π, a small correction may be added to C to ensure $\varphi_k(t)$ is exactly the same as $\varphi_k(t+T_{cycle})$.

As an example, assuming 6 digit accuracy of the delay and Δ=100 GHz comb spacing with the allowable +/−π phase mismatch, more than 1 μs delay in a target interferometer ($\tau_{target}$<(allowable phase mismatch)/(2π×accuracy× Δ)) can be measured, where accuracy refers to the accuracy of the measurement of $\tau_{ref}$ obtained with the reference interferometer. The higher the accuracy, the longer the range that can be measured. To maximize accuracy, precision temperature stabilization of the reference interferometer can be implemented. Also, to minimize the footprint of the overall system, a reference interferometer based on spirally coiled waveguides, can be implemented. Spirally coiled waveguides are for example described in M. E. Fermann et al., Systems and Methods for Low Noise Frequency Multiplication, Division, and Synchronization, US Patent Publication number: US 2018/0048113A1, which is hereby incorporated by reference herein in its entirety. Dispersion compensation in the reference interferometer can also be implemented.

Figure 15:
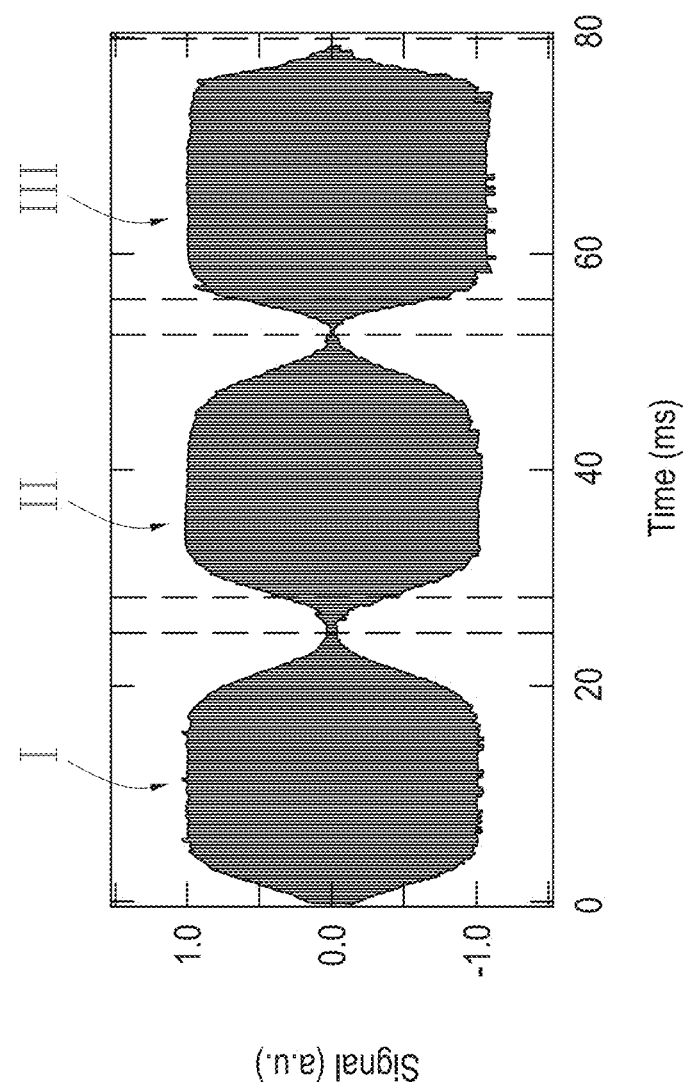
FIG. 15 is a representation of an actually measured coherently stitched FMCW LIDAR signal in the time domain based on coherently stitching the signals from three comb modes.

An example of a coherently stitched LIDAR signal, using the system shown in FIG. 12 with three channels, is shown in FIG. 15. The signal (in arbitrary units) is shown as a function of time. The overall signal includes three signal sections I, II, and III with approximately equal amplitude for a time period of 10 ms and decreasing amplitude at the peripheries of each of the signal sections. The decreasing amplitudes at the peripheries arise from the limitations of the WDM filters. Filters with infinitely steep cut-on and cut-off filter functions can in principle eliminate the decreasing amplitudes at the peripheries of the signal sections; in practice filter edges are not infinitely steep resulting in the observed amplitude modulation. The times between the dashed lines between sections I and II as well as between sections II and III represent the time where there is signal overlap in adjacent detection channels.

Figure 16A:
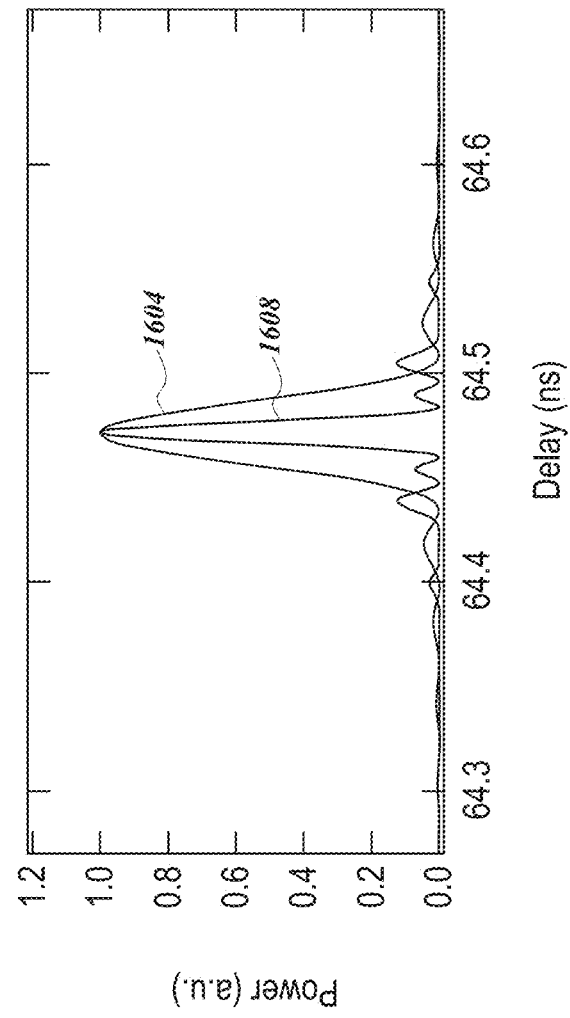
FIG. 16A is a representation of the spatial resolution (e.g., represented by round trip time delay to a single target) obtained without and with coherent stitching.
Figure 16B:
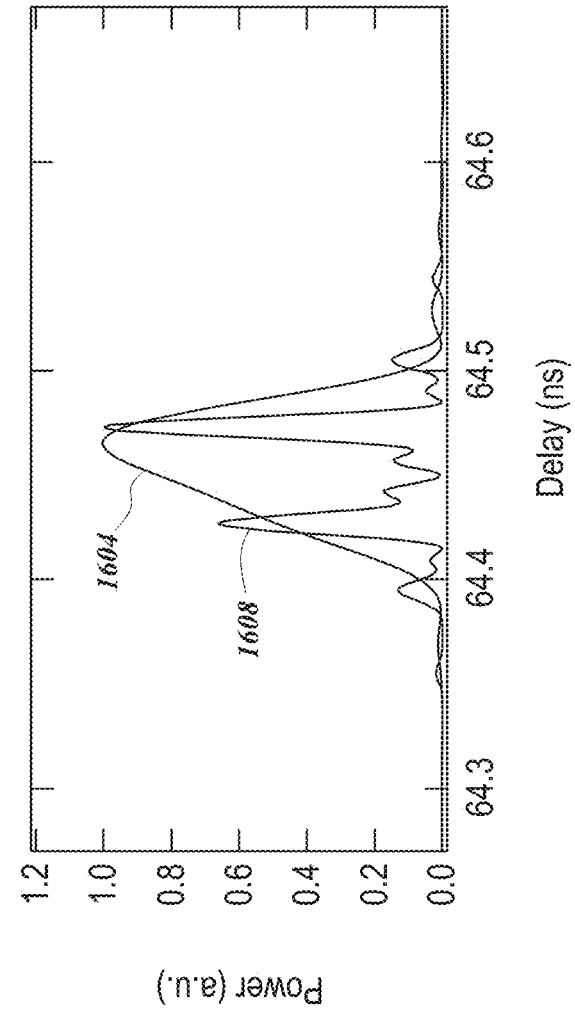
FIG. 16B is a representation of the spatial resolution (e.g., represented by round trip time delay to a dual target) obtained without and with coherent stitching. In this example, only with coherent stitching are the two targets distinguishable.

Examples of actual target measurements obtained from a Fourier transform of the LIDAR signal shown in FIG. 15, is shown in FIGS. 16A and 16B. FIG. 16A shows the enhancement of resolution obtained for a single target, and FIG. 16B shows the enhancement of resolution obtained for a dual target when using only one or three (coherently stitched)

WDM channels. Here the wider curves 1604 represents the target resolution obtained with only one channel, and the narrower curves 1608 represent the resolution obtained with three coherently stitched channels. Indeed LIDAR resolution increases inversely proportional to the number of stitched WDM channels.

The system as described with respect FIG. 12 is compatible with EO combs or any form of scanning MR combs. When using MR combs an additional issue may be addressed. As shown in FIG. 8, with scanning MR combs, the repetition frequency changes in addition to changes in the carrier envelope offset (CEO) frequency. In some implementations, there can be a difference between scanning an EO comb, which typically scans only the CEO frequency and not the repetition rate, and between scanning an MR comb, where both CEO frequency and repetition rate are changing. When scanning a MR comb, the comb spacing may change accordion-likewise, as illustrated in FIG. 17A. Here the solid lines indicate the comb mode spectrum before scanning and the dashed lines indicate the comb mode spectrum once the comb mode spacing has been changed. Because of this, when a comb spacing scan is involved, the time (called cycle time) when comb modes are scanned by the initial comb spacing ($\Delta_{rep0}$) depends on the comb mode number as shown in FIG. 17B. Additional signal processing may be utilized before proceeding with coherent stitching.

Figure 18:
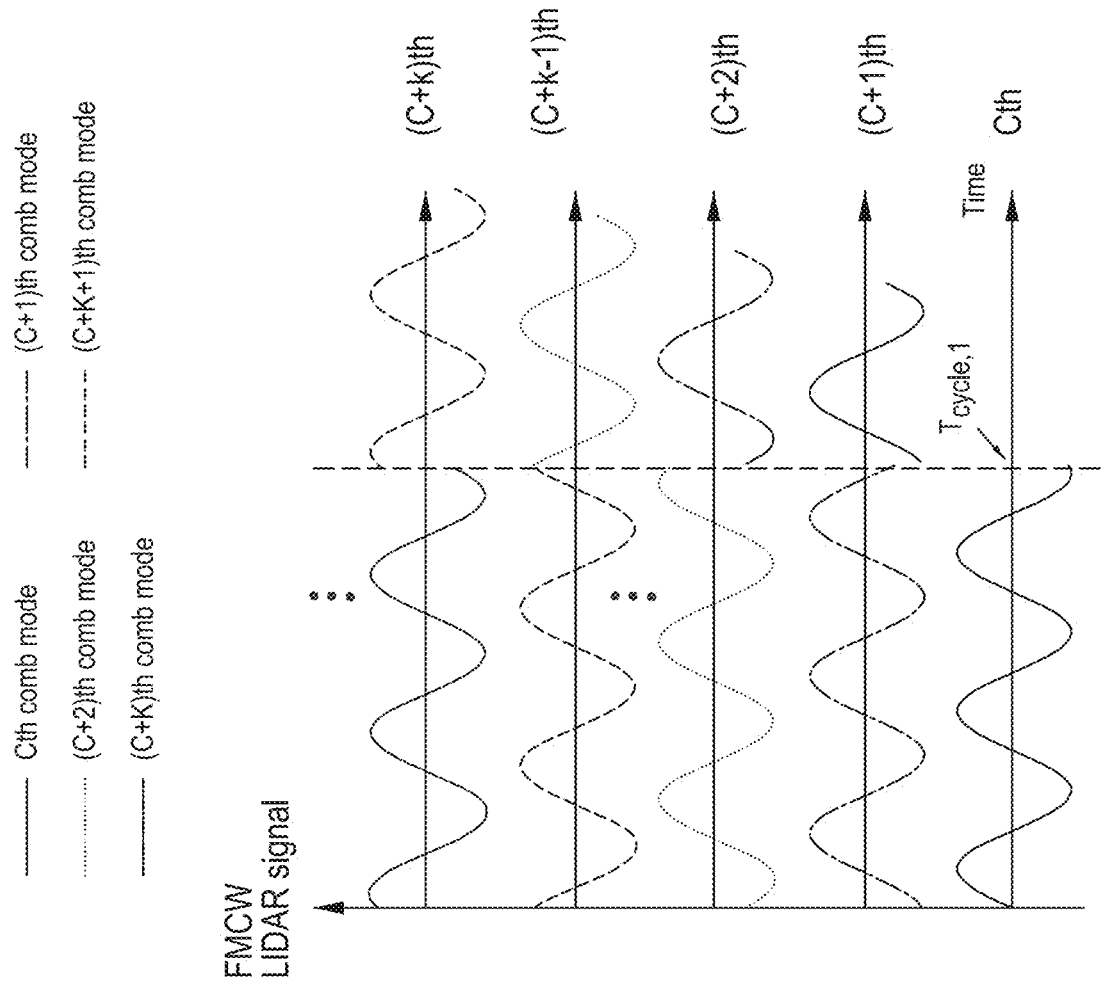
FIG. 18 schematically illustrates an example of the temporal signal evolution of the FMCW signals related to individual comb modes of a scanning microresonator comb after the implementation of temporal rescaling.

The additional signal processing can enforce the cycle times to be the same by rescaling the time axis for all comb modes, as illustrated in FIG. 18. An accurate rescaling factor can be obtained by constantly measuring the comb spacing with known comb mode numbers. Once the cycle times are aligned, all comb modes can be coherently stitched in the same way as explained with respect to FIG. 14.

A mathematical expression for the rescaled time $t_k$ corresponding to the rescaled time axis for the FMCW signal related to the kth comb mode can be obtained as:

$$t_k = \frac{\Delta_{rep0} + K\delta_{rep}}{\Delta_{rep0}} t,$$

where K is the channel number, $\Delta_{rep0}$ and $\delta_{rep}$ are the comb spacing before scanning and comb spacing change during the scanning, respectively.

For time rescaling, the repetition frequency of the frequency comb can be constantly measured in the RF domain. After time rescaling, all comb modes can be coherently stitched, for example, in the same way as when only the CEO frequency is scanned.

MR for Optical Clocks and Low Phase Noise Mmwave Generation

As discussed herein, microresonators can also be used for low phase noise microwave generation. For example, a microresonator can be locked to a fiber delay line. Some implementations use optical frequency division for low phase noise microwave generation. Optical frequency division is the opposite of frequency multiplication, used for coherently linking signals in the microwave domain to signals in in the optical domain as for example described in A. Rolland et al., "Non-linear optoelectronic phase-locked loop for stabilization of opto-millimeter waves: towards a narrow linewidth tunable THz source", Opt. Expr., vol. 19, pp. 17944 (2011). Frequency division is a technique for transferring the stability of an optical signal to the microwave domain through a self-referenced optical frequency comb, which (in the optimum case) can reduce the phase noise in the microwave domain by a factor of $1/N^2$, where N is the frequency ratio between the optical and microwave frequency, as for example described in T. M. Fortier et al., "Generation of ultrastable microwaves via optical frequency division", Nature Photonics, vol. 5, pp. 425 (2011).

We describe here the extension of the frequency division technique to the generation of mm wave (sometimes referred to herein as mmwave or mmw) signals with low phase noise, through the use of a high repetition rate MR Soliton comb. Some MR combs may generate relatively low energy per pulse. To provide higher energy per pulse, some systems may use two ultra-low phase noise cw lasers separated by a few THz to lock the repetition rate and the carrier envelope offset frequency of the soliton comb, as shown in the example mmwave oscillator system, displayed in FIG. 19.

Figure 19:
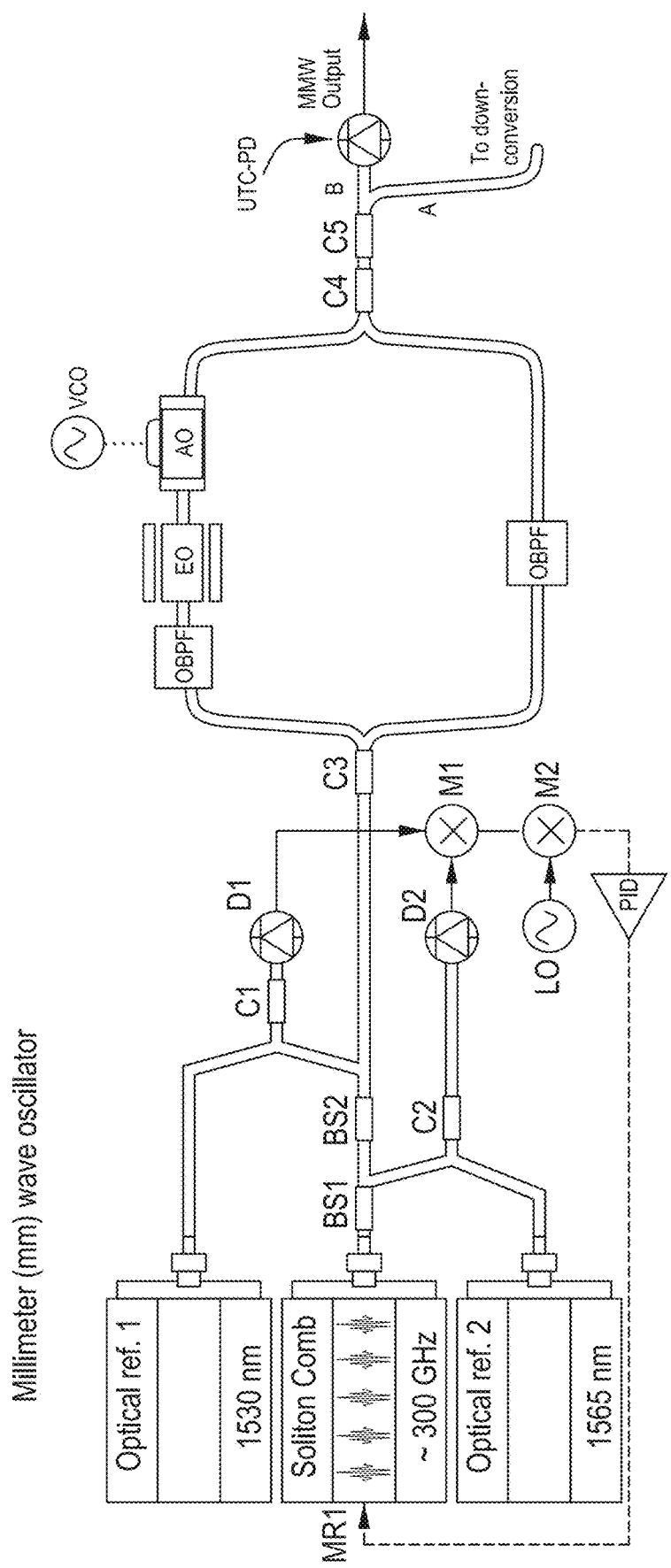
FIG. 19 schematically illustrates an example of the configuration of a microresonator-based low phase noise millimeter (mm) wave oscillator.

In FIG. 19, optical fibers connect the various components, but it is not a requirement of the mmwave oscillator system. Beam-splitter coupler BS1splits the output of the soliton microresonator comb MR1 (operating for example at a repetition frequency of 300 GHz) into two paths. Beam splitter coupler BS2, splits one of those beam paths by another factor of two. Coupler 1 (C1) combines the output from the soliton comb with the output of a first cw laser reference (Optical ref.1) and coupler 2 (C2) combines the output from the soliton comb with the output of a second cw laser reference (Optical ref.2). In the system shown in FIG. 19, the output of Optical ref.1 is at about 1530 nm, and the output of Optical ref.2 is at about 1565 nm; other output wavelengths can be used in other embodiments.

Figure 22:
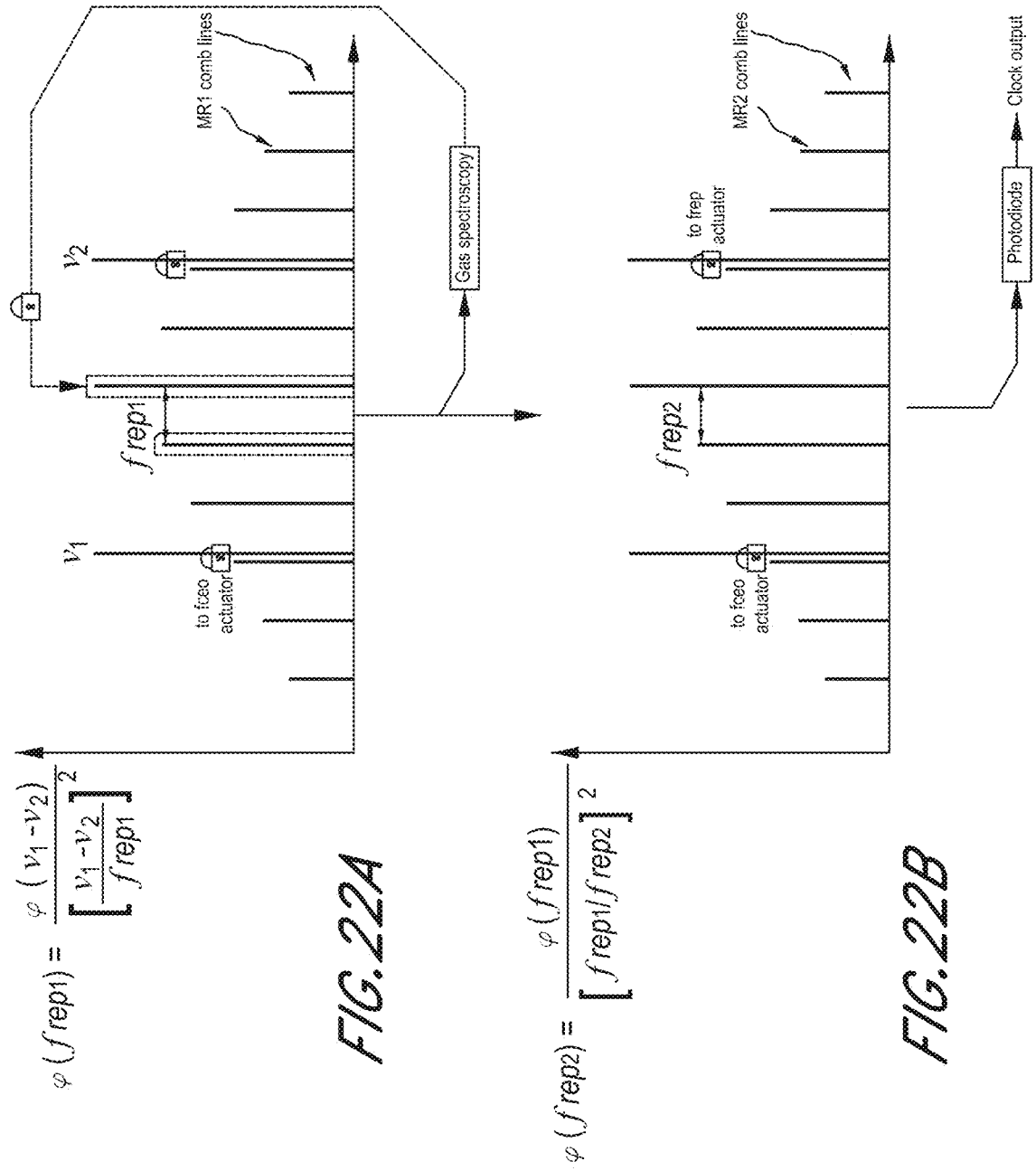
FIG. 22A schematically illustrates an example of the frequency spectra of a comb-based mm wave source and two continuous wave (cw) reference lasers related to a microresonator-based optical molecular clock.
FIG. 22B schematically illustrates an example of the frequency spectra of a comb-based mm wave to microwave down-converter and two cw reference lasers related to a microresonator based optical molecular clock.

An example of the involved comb modes of MR1 and cw laser frequencies are depicted in FIG. 22A, which will be further described below. The two combined outputs from the couplers C1 and C2 are directed to photodiodes D1 and D2 to generate two beat signals with next neighbor modes of the soliton comb. Mixer M1 combines the two beat signals and generates a secondary beat signal which is independent of the carrier envelope offset frequency of the soliton comb. The soliton comb repetition rate can then be stabilized via generating an error signal via mixing the secondary beat signal with a local oscillator (LO) at mixer M2 and directing the error signal via a PID controller to an actuator for controlling the repetition rate of the soliton comb. Such an actuator can comprise, for example, a heating element attached to MR1, as for example discussed with respect to FIG. 5.

With this scheme the phase noise of the soliton comb repetition rate is reduced via frequency division, resulting in an optimum case in a repetition rate phase noise $\varphi(f_{rep1})$ reduced to the differential phase noise between the two cw lasers $\varphi(\nu_1-\nu_2)$ divided by the square of the ratio of their frequency separation $\nu_1-\nu_2$ and the soliton comb repetition rate $f_{rep}$, e.g., $$\varphi(f_{rep1}) = \varphi(\nu_1-\nu_2)/[(\nu_1-\nu_2)/f_{rep1}]^2, \tag{C1}$$

as also shown in FIG. 22A. Assuming a frequency separation of 4.5 THz for the two cw laser and a repetition rate of 300 GHz (here 300 GHz is used only as an example, other frequencies in the range of 50 GHz-50 THz can also be used), this corresponds to a division factor of 23.3 dB. Compact or chip scale cw lasers can reach a frequency noise of 1 $Hz^2/Hz$ at 100 kHz offset frequency (for example: OEwaves HI-Q 1.5 Micron Laser) which provides a single side band phase noise at 300 GHz of −132.3 dBc/Hz. This level outperforms the phase noise of state-of-the-art mm wave sources multiplied up from oven controlled Quartz oscillators by more than 40 dB. The selection of a millimeter-wave repetition rate soliton comb provides for a high power per comb mode and can in principle achieve optical to millimeter-wave conversion with a mm wave phase noise governed by the shot noise limit.

Coupler C3 splits the output of MR1 and the optical bandpass filters (OBPF) filter out two individual MR comb modes whose difference frequency is determined by the wavelength difference of these two optical comb modes. The EO modulator (EO) frequency modulates one of the two comb modes. Coupler C4 recombines the two comb modes and coupler C5 splits a fraction of the optical power along path A and path B. A uni-travelling-carrier photodiode (UTC-PD) can be used to convert two optical wavelengths propagating along path B to a single tone in the millimeter-wave and THz domain whose frequency is determined by the wavelength difference of the optical lines. In order to tune the millimeter-wave source, an acousto-optic modulator (or acousto-optic frequency shifter) AO on the optical path of one wavelength (or both wavelengths) can be introduced, as shown in FIG. 19. Fine tunability of the millimeter-wave source can be advantageous in order to stabilize the long-term frequency drift to an external reference. An output from coupler C5 (along path A in FIG. 19) can lead to a down-conversion system, e.g., described with reference to FIG. 20.

Figure 20:
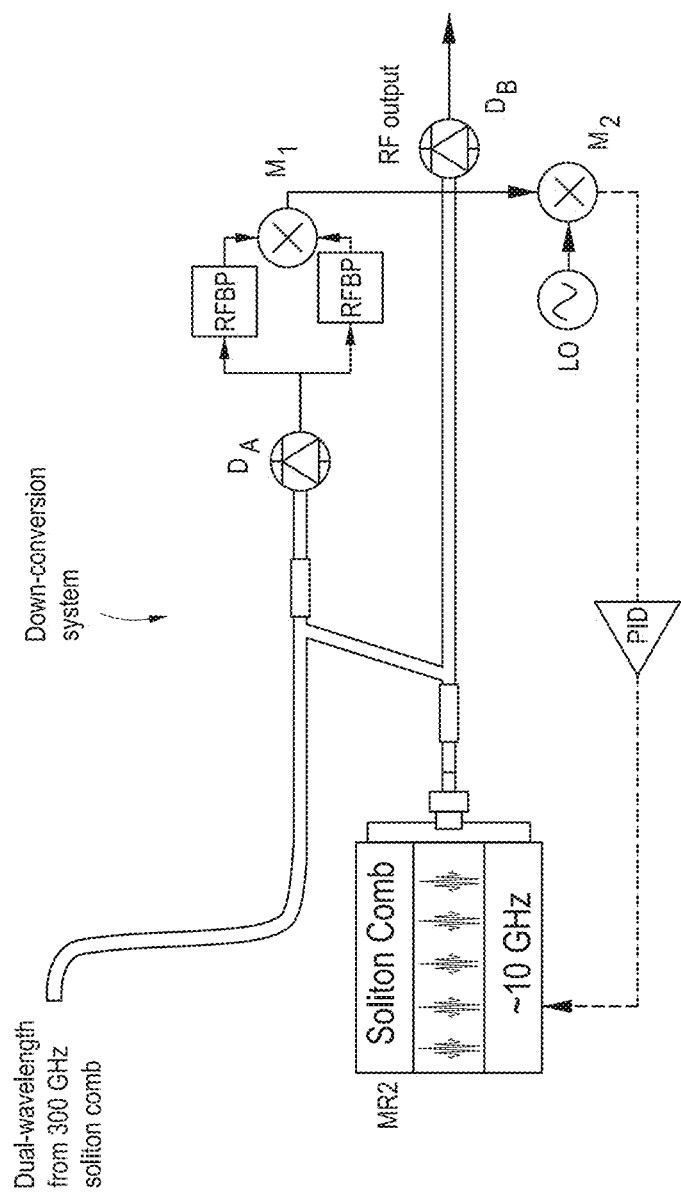
FIG. 20 schematically illustrates an example of the configuration of a microresonator-based frequency down-converter, converting a mm wave signal to a micrometer wave signal.

FIG. 20 schematically illustrates an example of a configuration of a microresonator-based frequency down-converter, converting a mm wave signal to a micrometer wave signal. In order to down convert the millimeter-wave beat note to the RF domain, a second frequency comb, for example a MR comb, denoted as MR2 in FIG. 20, at a lower repetition frequency than the soliton comb in FIG. 19 can be used. The input to the down-converter can be obtained from the coupler C5 output along path A (shown in FIG. 19) and comprises the two cw laser wavelengths separated by the desired frequency spacing. Conveniently a MR soliton comb oscillating at a frequency of 10 GHz can be used, however, an MR frequency in a range from 1-30 GHz and even higher or lower can also be used. If small size is not required, also a modelocked solid-state laser, a modelocked fiber or diode laser, or an EO comb can be used for down-conversion. The second frequency comb MR2 may be stabilized in the same fashion as the 300 GHz soliton comb, shown in FIG. 19. For example, a detector DA detects the two beats of the two cw lasers with nearest neighbor comb lines from MR2. The involved comb lines and cw laser frequencies are separately depicted in FIG. 22B.

Returning to FIG. 20, the two beats are filtered in the RF domain by two RF bandpass filters (RFBP). The two beats are subsequently mixed by the shown mixer $M_1$, generating a secondary beat signal. The mixer $M_1$ reduces or eliminates the carrier envelope offset frequency of MR2 from the secondary beat signal. The secondary beat signal is then mixed with a local oscillator, LO, (for example at a frequency of 10 MHz), generating an error signal via a PID controller which is fed back to a repetition rate controller in MR2, for example a heating element as discussed with respect to FIG. 5. The intermodal beat frequency from MR2 is then detected with detector $D_B$ and generates an ultra-stable output at the repetition rate of MR2.

This way, the two wavelengths from the two cw lasers separated by 300 GHz are used to stabilize the repetition rate of MR2. Therefore the repetition rate at 10 GHz carries the differential phase noise of the two cw lasers with a frequency separation of 300 GHz. In other words the frequency stability of the 10 GHz signal is the same (or nearly the same) as the stability of the difference frequency at 300 GHz.

Furthermore, this 10 GHz signal can be used to lock the generated mmwave to an external reference such as a MASER, an oven-controlled crystal oscillator (OCXO), etc., thereby ensuring long-term stability. Alternatively other precision frequency references such as a MASER, OCXO, etc. can be locked to the present 10 GHz signal, when using the 10 GHz itself as an optical clock output signal as explained in the following.

Millimeter-wave transitions in the rotational spectrum of molecules can provide a timing reference that can be used to develop chip-scale atomic clocks. For example a fully electronic THz clock was demonstrated based on CMOS technology, as described in C. Wang et al., "An on-chip fully electronic molecular clock based on sub-terahertz molecular spectroscopy", Nature Electronics (2018). Such electronic molecular clocks are limited by phase noise and stability of the local oscillator at the molecular transition. The MR soliton comb approach can leverage this limitation, while allowing for construction in a chip-scale manner.

Figure 21:
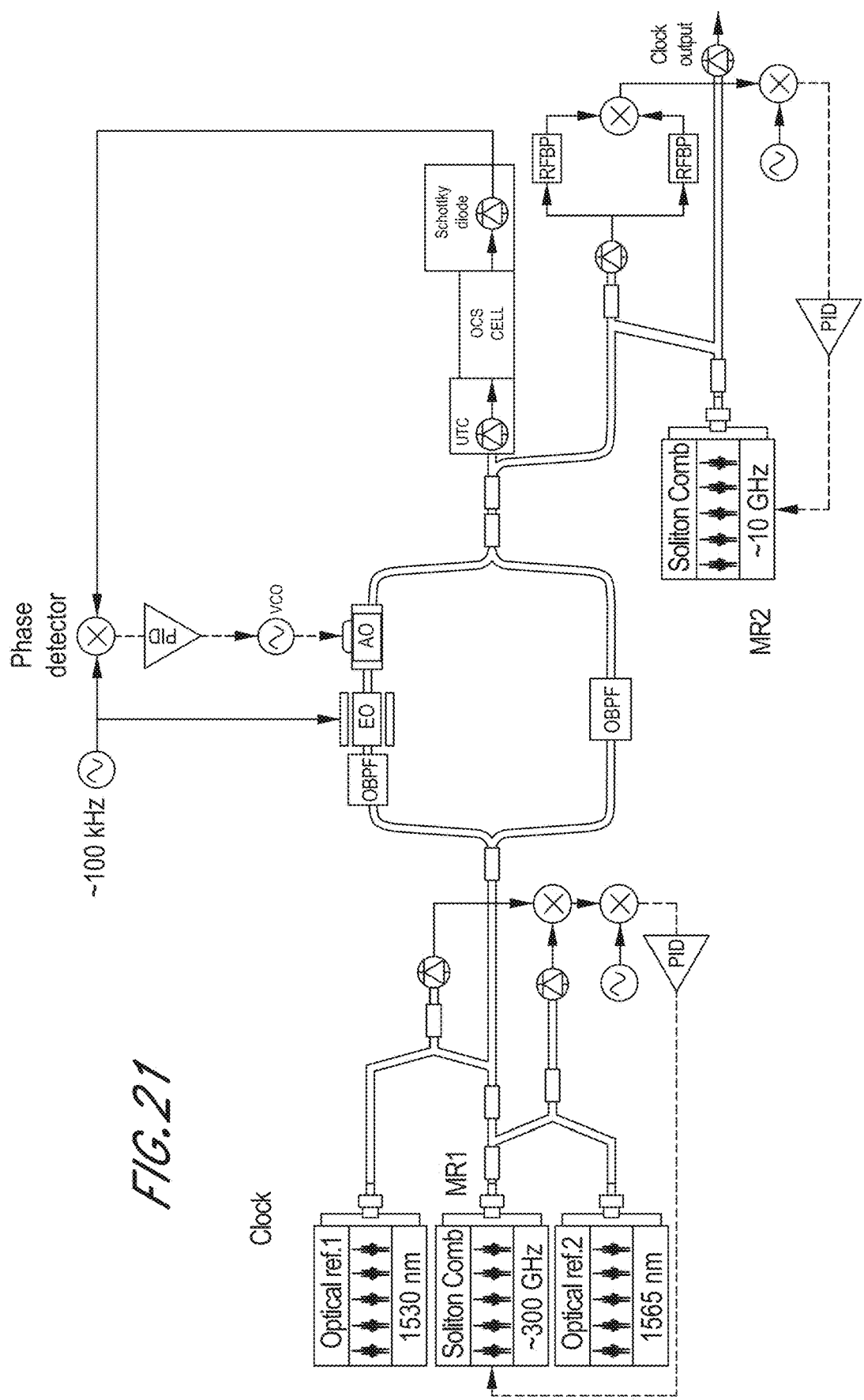
FIG. 21 schematically illustrates an example of the configuration of a microresonator-based optical molecular clock.

An example of an implementation of such an optical molecular clock is shown in FIG. 21. The system comprises a local oscillator based on two cw lasers locked to MR1, as described with respect to FIG. 19 as well as a down-conversion unit using MR2 to down-convert the clock frequency in the sub-THz range to a countable frequency in the microwave domain, e.g., as described with respect to FIG. 20. These systems are augmented by a combination of a waveguide-coupled UTC photodiode, for example IOD-PMJ-13001 available from NTT Electronics Corp., a gas cell based for example on a carbonyl sulfide (OCS) gas cell, and a Schottky barrier diode (SBD), for example WR3.4ZBD available from Virginia Diodes, Inc. In FIG. 21, a gas cell containing OCS molecular gas is shown, but other gases with appropriate absorption spectra can also be used. Preferably the gas cell contains gas (e.g., OCS) at reduced atmospheric pressure to reduce or minimize pressure broadening of the absorption lines. The UTC-PD converts the two optically filtered cw lasers (locked to individual soliton comb modes in MR1) separated by frep1 into a millimeter-wave tone. This signal is coupled into a gas cell designed to act as a waveguide for the millimeter-wave tone, ensuring a long interaction length. The signal transmitted through the gas cell is detected by the SBD.

In order to stabilize the frequency of the mm wave, an AO frequency shifter shown in FIG. 21 can be utilized, which can frequency shift the wavelength of one of the cw lasers. Down-conversion of the two optical tones separated by frep1 is realized through the second soliton MR comb, MR2 operating at repetition frequency frep2 which is a microwave frequency directly photodetected by photodetector $D_2$. Frep2 carries the noise fluctuations of the OCS gas cell.

An example implementation for locking the mmw tone to the gas cell is also shown in FIG. 21. Similar to conventional chip-scale atomic clocks (CSACs), the molecular clock performs closed-loop dynamic frequency corrections to the AO through the shown VCO. To detect the frequency error between the mmw tone $f_{mmw}$ and the spectral line center $f_{OCS}$ of a chosen reference absorption line in the OCS gas cell, frequency-shift keying (FSK) can be implemented. In FSK, the mmw tone impinging on the gas cell is modulated at a frequency $f_m$ preferably at around $1/10^{th}$ of the transition line width. For an OCS gas cell at a preferred pressure of around 1-30 Pa, the modulation frequency can be around 100 kHz. The modulation frequency can for example be applied through an electro-optic modulator EO shown in FIG. 21, which modulates one of the two cw wavelengths.

As a result of the frequency modulation, the instantaneous frequency of the probing signal is periodically toggled between $f_{mmw}+f_m$ and $f_{mmw}-f_m$. If $f_{mmw}$ is not at the center of the absorption line, the gas absorption is different between the two half duty cycles. The Schottky diode measures the modulation signal, which is then converted via a PID to an error signal which controls the frequency of the VCO shown in FIG. 21. When $f_{mmw}$ is at the center of the absorption line, the error signal is zero.

For illustration, the frequencies in the mmwave optical clock are displayed in FIGS. 22A and 22B. FIG. 22A represents the comb spectrum related to soliton MR comb MR1. MR1 is locked to the two cw lasers at frequencies $v_1$, $v_2$ via phase-locking of two next neighbor MR1 comb lines. For generality, it is shown that the two next neighbor comb lines can be locked via an actuator acting on both the repetition rate as well as the carrier envelope offset frequency. When a mixer is used to mix the two beat signals between the cw lasers and next neighbor comb lines (as discussed with respect to FIG. 19), the actuator on the carrier envelope offset frequency can be omitted. The repetition rate $f_{rep1}$ is then stabilized via the schematically shown feedback loop interrogating a chosen molecular absorption line in the gas cell (e.g., described with reference to FIG. 21). With repetition rate $f_{rep1}$ stabilized, the generated mmwave at frequency $f_{rep1}$ is also stabilized.

The down-conversion from $f_{rep1}$ to $f_{rep2}$ is schematically illustrated in FIG. 22B. Here MR2 is also phase locked to the two cw laser lines, which in turn stabilizes the repetition rate of MR2 at $f_{rep2}$, which can be counted by a frequency counter. Again with the use of a mixer only one actuator is required for locking MR2 to the two cw laser lines. When MR2 is stabilized the phase noise of the repetition rate $f_{rep2}$ can be written as follow (see FIG. 22B):

$$\varphi(f_{rep2}) = \frac{\varphi(f_{rep1})}{[f_{rep1}/f_{rep2}]^{\wedge}2}, \qquad (C2)$$

e.g., the phase noise at frep2 is decreased by the frequency ratio $(f_{rep1}/f_{rep2})^2$.

The photodetected signal at frep2 is a direct readout of the THz molecular clock as it carries the fractional stability of frep1 which is dependent on the fluctuation of the OCS gas cell.

Similarly as explained with respect to eq. (C1), eq. (C2) shows that a phase noise reduction can be obtained via frequency division. Combining eq. (C1) and eq. (C2), the phase noise at frequency frep2 is obtained as $$\varphi(f_{rep2}) = \varphi(v_1-v_2)/[(v_1-v_2)/f_{rep2}]^2, \qquad (C3)$$

e.g., the overall division factor of the system is given by $[(v_1-v_2)/f_{rep2}]^2$. Hence the output from photodetector $D_B$ can also be a very compact source of low phase noise microwave radiation. For a frequency separation of 4.5 THz between the cw lasers, and $f_{rep2}$ of 10 GHz, the phase noise reduction factor is 53 dB. The microwave signal from embodiments of the molecular clock can have a stability $<10^{-12}$ in 1 second.

Figure 23:
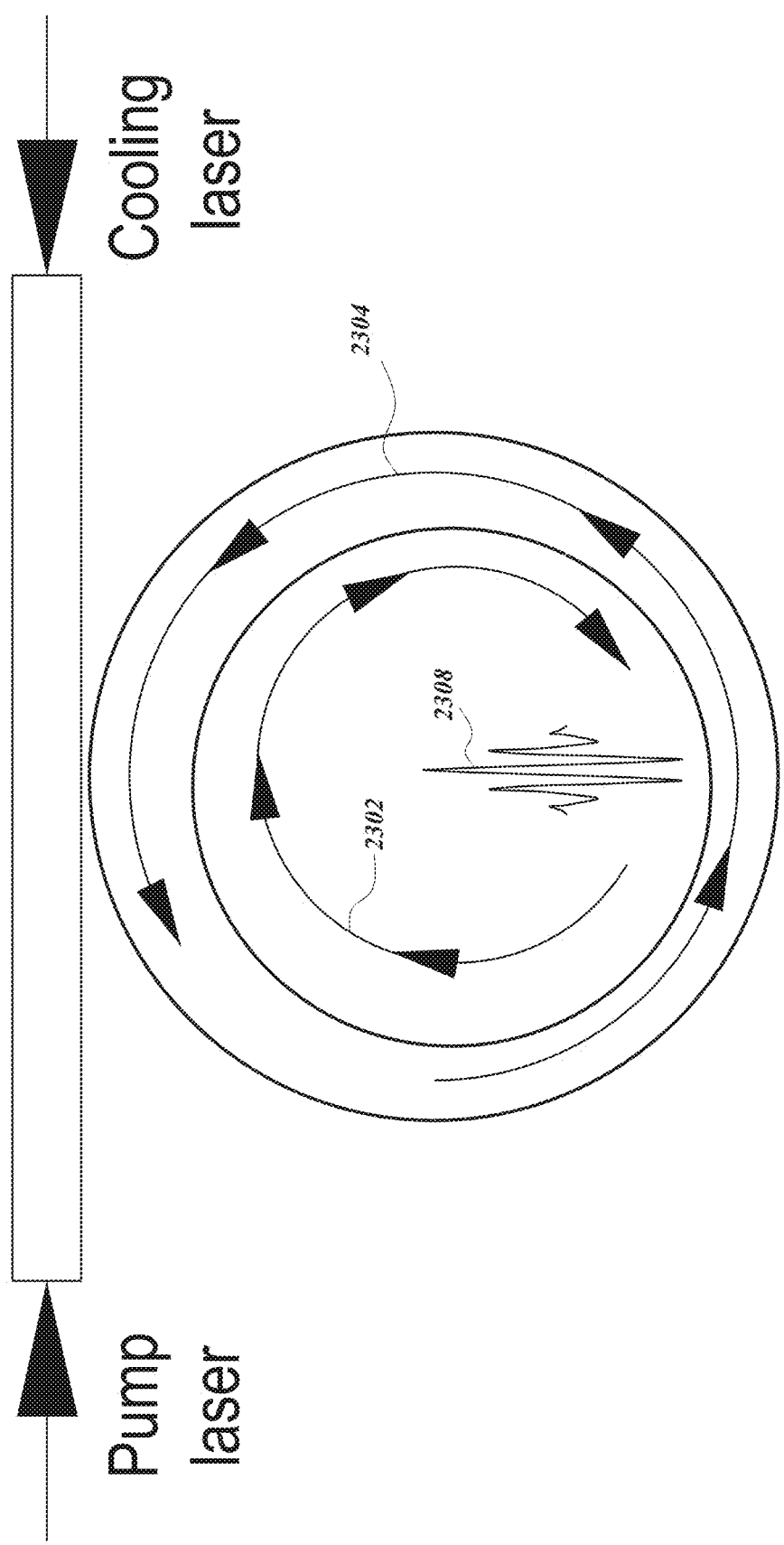
FIG. 23 schematically illustrates an example of a microresonator comprising both a pump and a cooling laser.

For low phase noise micro or mm wave generation as well as the utmost frequency stability of molecular clocks in general, it may be further useful to optically cool the microresonators described here. Optical cooling can for example be obtained by injecting a cooling laser counter-directionally to the MR pump laser as for example discussed in T. E. Drake, "Thermal decoherence and laser cooling of Kerr microresonator solitons', https://arxiv.org/pdf/1903.00431.pdf. A schematic example of the implementation of a cooling laser in conjunction with a micro-resonator is shown in FIG. 23. In this example, the MR pump laser is propagating clock-wise (shown as curve 2302). The cooling laser is propagating counter-clockwise (shown as curve 2304). A short soliton pulse is generated with the pump laser and is represented in the bottom of FIG. 23 as curve 2308.

With low noise soliton MR combs, MR combs with sub-THz repetition rates can be eliminated and a molecular optical clock can be constructed with only one soliton MR comb, operating at moderate repetition rates between 3-30 GHz eliminating the need for a separate down-conversion unit. Alternatively, a solid-state or fiber laser with appropriate frequency broadening stages could also be used. Such a soliton MR comb operating at moderate repetition rates can be stabilized to two cw lasers in the same fashion as explained with respect to FIG. 19.

The UTC-PD then detects a multiple of the MR comb repetition rate around the transition frequency of a molecular gas absorption line. The feedback signal generated with the help of the absorption cell can be used to modulate the frequency of one of the cw lasers through the AO modulator, as previously discussed with respect to FIG. 21. A fraction of the output of the MR soliton comb can then be directed to another detector, in function, similar to detector $D_B$ in FIG. 20 to detect the inter-modulational beat signal between the comb lines and the corresponding repetition rate of the MR comb, which is the desired countable clock signal. Hence a separate frequency down-conversion unit and a second MR soliton comb are not required with such a set up.

Additional Aspects

1. A microresonator based frequency comb comprising: a continuous wave (cw) pump laser, a microresonator, configured for receiving said cw laser, a single-sideband (SSB) Mach Zehnder modulator configured for frequency and amplitude modulation of said cw laser, said SSB modulator configured for inducing a coherent soliton state in said microresonator, said SSB modulator further configured for long-term carrier envelope offset frequency, fceo, and repetition rate, frep, locking of said microresonator.

2. A microresonator based frequency comb comprising: a continuous wave (cw) pump laser, a microresonator, configured for receiving output from said cw laser, at least one graphene modulator deposited on said microresonator configured for modulation of the cavity length of said microresonator, said graphene modulator further configured for long-term locking of one or more of: carrier envelope offset frequency, fceo, repetition rate, frep, or resonance offset frequency, ROF, of said microresonator.

3. A microresonator based frequency comb comprising: a continuous wave (cw) semiconductor pump laser, receiving a pump current; a microresonator, MR, configured for receiving said cw laser, at least one microheater, receiving a heating current and further configured for modulation of the cavity length of said microresonator, said MR configured for long-term stable carrier envelope offset frequency, fceo, and repetition rate, frep, locking via control of said pump and heating currents, said long-term stable fceo and frep locking facilitated by tuning said microresonator resonance offset frequency, ROF, to an operational point in a range of 1-10 times the MR cavity linewidth on the red side of an MR cavity resonance.

4. A microresonator based frequency comb according to aspect 3, said ROF tuned to a point, where fceo changes resulting from pump current modulation induced frequency modulations are small compared to fceo changes resulting from pump current induced power modulations.

5. A frequency scanning soliton microresonator frequency comb comprising: a continuous wave (cw) semiconductor pump laser, configured to receive a pump current and to emit light at a pump frequency; a microresonator, MR, having a free spectral range (FSR), said MR configured to receive said light from said cw laser, said MR configured to emit comb modes separated in frequency space approximately by said FSR, at least one modulator configured to scan the comb modes by a substantial fraction of said FSR while preserving soliton operation in said MR, said substantial fraction corresponding to more than 5% of said FSR.

6. A frequency scanning soliton microresonator frequency comb according to aspect 5, wherein said substantial fraction corresponds to more than 10%, more than 50%, or more than 100% of said FSR.

7. A frequency scanning soliton microresonator frequency comb comprising: a continuous wave (cw) semiconductor pump laser, configured to receive a pump current and to emit light at a pump frequency; a microresonator, MR, configured for receiving said light from said cw laser, and having a resonance frequency; at least one modulator configured to simultaneously scan said pump frequency and said MR resonance frequency.

8. A frequency scanning soliton microresonator frequency comb according to any of aspects 5-7, further configured for dead-zone free spectroscopy, the comb further comprising: a sample under test arranged to receive the output of said frequency scanning microresonator frequency comb; a wavelength division multiplexing system configured to split an output from said sample under test onto an array of photodetectors.

9. A frequency scanning soliton microresonator frequency comb according to any one of aspects 5-7, further configured for multi-wavelength LIDAR.

10. A frequency scanning microresonator frequency comb according to any one of aspects 5 to 7, further configured for multi-wavelength frequency modulated cw (FMCW) LIDAR.

11. A frequency scanning soliton microresonator frequency comb according to any one of aspects 5-7, 9, or 10 further configured to coherently stitch together at least two channels of a multi-wavelength frequency modulated continuous wave (FMCW) LIDAR system.

12. A frequency scanning soliton microresonator frequency comb according to any one of aspects 5-11, further comprising: a feedback loop configured to act on said MR resonance frequency or said pump frequency.

13. A frequency scanning soliton microresonator frequency comb according to any one of aspects 5-12, further comprising: a feedback loop configured to stabilize a resonance offset frequency (ROF) of said microresonator.

14. A frequency scanning soliton microresonator frequency comb according to any one of aspects 5-13, further comprising: a feedback loop configured to act on an output power of said MR.

15. A frequency modulated continuous wave (FMCW) LIDAR system comprising: an FMCW laser source; said FMCW laser source configured to pump a frequency comb source; said comb source comprising a frequency comb with individual frequency modulated comb lines, said comb lines separated by a frequency spacing; said comb source directed to a target via a target interferometer; a wavelength division multiplexing (WDM) system, said WDM system configured to receive optical output from said target interferometer, said WDM system further configured to optically separate the optical output of said target interferometer into individual frequency channels with a frequency spacing equivalent to the frequency spacing of said individual comb lines; a detector array configured to receive the signal from said frequency channels; a digital signal processing unit, said digital signal processing unit configured to coherently stitch together signals of at least two adjacent frequency channels, thereby increasing the spatial resolution of said LIDAR system.

16. An FMCW LIDAR system according to aspect 15, said frequency comb comprising an electro-optic comb.

17. An FMCW LIDAR system according to aspect 15 or aspect 16, said frequency comb comprising a microresonator comb.

18. An FMCW LIDAR system according to any one of aspects 15-17, said WDM system further configured to provide for some spectral overlap between adjacent channels.

19. An FMCW LIDAR system according to any one of aspects 15-18, further including a reference interferometer, said reference interferometer configured to track or control the frequency modulation of said FMCW laser source.

20. An FMCW LIDAR system according to aspect 19, said reference interferometer configured to linearize a change of frequency per unit time of said frequency modulated cw laser source via a feedback loop.

21. An FMCW LIDAR system according to aspect 19 or aspect 20, said reference interferometer configured to provide a sampling grid for sampling the optical output emerging from the target interferometer.

22. A molecular clock comprising: a primary microresonator comb, said microresonator comb having a repetition rate, a carrier envelope offset frequency, and producing an output in the form of individual comb lines separated by said repetition rate; at least said microresonator repetition rate locked to two low phase noise continuous wave (cw) lasers separated by a difference frequency, said difference frequency being larger than a frequency corresponding to said repetition rate of said microresonator comb, an optical beat signal derived from two of said individual comb lines, said beat signal locked to a molecular absorption line in the frequency range from 50 GHz-50 THz, thereby stabilizing the frequency of said beat signal.

23. A molecular clock, according to aspect 22, further comprising a secondary microresonator comb configured to down-convert said difference frequency to the microwave domain.

24. A molecular clock comprising: a microresonator comb, said microresonator comb having a repetition rate, a carrier envelope offset frequency, and configured to produce an output in the form of individual comb lines separated by said repetition rate; first and second continuous wave (cw) reference lasers, said microresonator repetition rate locked to a difference frequency between said first and second cw reference lasers, an optical beat signal derived from two of said individual comb lines, at least one modulator configured to modulate a frequency of said beat signal, a primary photodiode configured to convert said modulated beat signal into a modulated millimeter wave (mmwave) frequency centered on a center frequency in the mmwave domain, said modulated mmwave signal interrogating a reference absorption line of a molecular gas contained in a gas cell, a demodulator configured to demodulate said modulated mmwave signal transmitted by said gas cell, creating a demodulation signal, said demodulation signal in conjunction with a local oscillator signal creating an error signal, said error signal via a PID controller driving a voltage controlled oscillator (VCO), said VCO driving another modulator, which stabilizes the mmwave center frequency with respect to an absorption line inside said gas cell.

25. A molecular clock according to aspect 24, said demodulator comprising a Schottky barrier diode.

26. A molecular clock according to aspect 24 or aspect 25, said primary photodiode comprising a uni-travelling-carrier (UTC)-diode.

27. A molecular clock according to any one of aspects 24-26, said modulated mmwave frequency being modulated with a phase modulator at a frequency in a vicinity of the bandwidth of said absorption line.

28. A molecular clock, according to any one of aspects 22-27, further configured to generate a low phase noise microwave signal.

29. A molecular clock, according to any one of aspects 22-28, further configured to generate a microwave signal with a stability $<10^{-12}$ in 1 second.

Additional Information

Example, non-limiting experimental data are included in this specification to illustrate results achievable by various embodiments of the systems and methods described herein. All ranges of data and all values within such ranges of data that are shown in the figures or described in the specification are expressly included in this disclosure. The example experiments, experimental data, tables, graphs, plots, figures, and processing and/or operating parameters (e.g., values and/or ranges) described herein are intended to be illustrative of operating conditions of the disclosed systems and methods and are not intended to limit the scope of the operating conditions for various embodiments of the methods and systems disclosed herein. Additionally, the experiments, experimental data, calculated data, tables, graphs, plots, figures, and other data disclosed herein demonstrate various regimes in which embodiments of the disclosed systems and methods may operate effectively to produce one or more desired results. Such operating regimes and desired results are not limited solely to specific values of operating parameters, conditions, or results shown, for example, in a table, graph, plot, or figure, but also include suitable ranges including or spanning these specific values. Accordingly, the values disclosed herein include the range of values between any of the values listed or shown in the tables, graphs, plots, figures, etc. Additionally, the values disclosed herein include the range of values above or below any of the values listed or shown in the tables, graphs, plots, figures, etc. as might be demonstrated by other values listed or shown in the tables, graphs, plots, figures, etc. Also, although the data disclosed herein may establish one or more effective operating ranges and/or one or more desired results for certain embodiments, it is to be understood that not every embodiment need be operable in each such operating range or need produce each such desired result. Further, other embodiments of the disclosed systems and methods may operate in other operating regimes and/or produce other results than shown and described with reference to the example experiments, experimental data, tables, graphs, plots, figures, and other data herein.

Thus, the invention has been described in several non-limiting embodiments. It is to be understood that the embodiments are not mutually exclusive, and elements described in connection with one embodiment may be combined with, rearranged, or eliminated from other embodiments in suitable ways to accomplish desired design objectives. No single feature or group of features is necessary or required for each embodiment. All possible combinations and sub-combinations of elements are included within the scope of this disclosure.

For purposes of summarizing the present invention, certain aspects, advantages and novel features of the present invention are described herein. It is to be understood, however, that not necessarily all such advantages may be achieved in accordance with any particular embodiment. Thus, the present invention may be embodied or carried out in a manner that achieves one or more advantages without necessarily achieving other advantages as may be taught or suggested herein.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" or "an" or "the" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A molecular clock, comprising:
a primary microresonator comb, said microresonator comb having a repetition rate, a carrier envelope offset frequency, and producing an output in the form of individual comb lines separated by said repetition rate;

at least said microresonator repetition rate locked to two low phase noise continuous wave (cw) lasers separated by a difference frequency, said difference frequency being larger than a frequency corresponding to said repetition rate of said microresonator comb; and an optical beat signal derived from two of said individual comb lines, said beat signal locked to a molecular absorption line in the frequency range of 50 GHz 50 THz, thereby stabilizing the frequency of said beat signal.

2. A molecular clock, according to claim 1, further comprising a secondary microresonator comb configured to down-convert said difference frequency to the microwave domain.

3. A molecular clock, comprising:

a microresonator comb having a repetition rate, a carrier envelope offset frequency, and configured to produce an output in the form of individual comb lines separated by said repetition rate;

first and second continuous wave (cw) reference lasers, said microresonator repetition rate locked to a difference frequency between said first and second cw reference lasers, an optical beat signal derived from two of said individual comb lines;

at least one modulator configured to modulate a frequency of said beat signal;

a primary photodiode configured to convert said modulated beat signal into a modulated millimeter wave (mmwave) frequency centered on a center frequency in the mmwave domain, said modulated mmwave signal interrogating a reference absorption line of a molecular gas contained in a gas cell; and a demodulator configured to demodulate said modulated mmwave signal transmitted by said gas cell, creating a demodulation signal, said demodulation signal in conjunction with a local oscillator signal creating an error signal, said error signal via a proportional-integral-derivative (PID) controller driving a voltage controlled oscillator (VCO), said VCO driving another modulator, which stabilizes the mmwave center frequency with respect to an absorption line inside said gas cell.

4. A molecular clock according to claim 3, said demodulator comprising a Schottky barrier diode.

5. A molecular clock according to claim 3, said primary photodiode comprising a uni-travelling-carrier (UTC)-diode.

6. A molecular clock according to claim 3, said modulated mmwave frequency being modulated with a phase modulator at a frequency in a vicinity of the bandwidth of said absorption line.

7. A molecular clock, according to claim 3, further configured to generate a low phase noise microwave signal.

8. A molecular clock, according to claim 3, further configured to generate a microwave signal with a stability $<10^{-12}$ in 1 second.

* * * * *

UNITED STATES PATENT AND TRADEMARK OFFICE
CERTIFICATE OF CORRECTION

PATENT NO. : 11,409,185 B2
APPLICATION NO. : 17/225012
DATED : August 9, 2022
INVENTOR(S) : Naoya Kuse It is certified that error appears in the above-identified patent and that said Letters Patent is hereby corrected as shown below:

In the Specification

In Column 14, Line 62, delete "A" and insert --$\Delta$--.

In Column 15, Line 32, delete "A," and insert --$\Delta$,--.

In the Claims

In Column 27, Claim 1, Lines 10-11, delete "50 GHz 50 THz," and insert --50 GHz-50 THz,--.

Signed and Sealed this
Twenty-second Day of November, 2022

Katherine Kelly Vidal
*Director of the United States Patent and Trademark Office*